US009131283B2

(12) United States Patent
Patel et al.

(10) Patent No.: US 9,131,283 B2
(45) Date of Patent: Sep. 8, 2015

(54) APPARATUS AND METHODS FOR MULTIMEDIA COORDINATION

(71) Applicant: Time Warner Cable Inc., New York, NY (US)

(72) Inventors: Vipul Patel, Upper Holland, PA (US); Kenneth Gould, Reston, VA (US); David Chen, Jamison, PA (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 0 days.

(21) Appl. No.: 13/715,976

(22) Filed: Dec. 14, 2012

(65) Prior Publication Data

US 2014/0173652 A1      Jun. 19, 2014

(51) Int. Cl.
| | |
|---|---|
| H04N 7/10 | (2006.01) |
| H04N 21/81 | (2011.01) |
| H04N 21/258 | (2011.01) |
| H04N 21/414 | (2011.01) |
| H04N 21/442 | (2011.01) |
| H04N 21/4784 | (2011.01) |
| H04N 21/658 | (2011.01) |

(52) U.S. Cl.
CPC ....... *H04N 21/812* (2013.01); *H04N 21/25883* (2013.01); *H04N 21/41407* (2013.01); *H04N 21/44222* (2013.01); *H04N 21/4784* (2013.01); *H04N 21/6582* (2013.01)

(58) Field of Classification Search
CPC ............ H04N 21/812; H04N 21/4532; H04N 21/25883; H04N 7/165
USPC .................. 725/33–36, 86–118; 709/217–232
See application file for complete search history.

(56) References Cited

U.S. PATENT DOCUMENTS

| 4,546,382 A | 10/1985 | McKenna et al. |
|---|---|---|
| 4,602,279 A | 7/1986 | Freeman |
| 4,905,080 A | 2/1990 | Watanabe et al. |
| 4,930,120 A | 5/1990 | Baxter et al. |
| 5,155,591 A | 10/1992 | Wachob |
| 5,373,315 A | 12/1994 | Dufresne et al. |
| 5,481,294 A | 1/1996 | Thomas et al. |

(Continued)

FOREIGN PATENT DOCUMENTS

WO       WO 01/91474       11/2001

OTHER PUBLICATIONS

Specification of U.S. Appl. No. 13/676,012, filed Nov. 13, 2012 and entitled "Apparatus and Methods for Selective Enforcement of Secondary Content Viewing" (pp. 1-49).

*Primary Examiner* — Annan Shang
(74) *Attorney, Agent, or Firm* — Gazdzinski & Associates, PC

(57) ABSTRACT

Methods and apparatus for providing coordination between two or more different media distribution channels. In one embodiment, the apparatus includes a server and associated client processes disposed ob various components of a managed content distribution network (e.g., cable or satellite network). The server process coordinates with the client processes to obtain user interactivity data useful is assessing the efficacy of certain secondary content (e.g., advertisements). In one variant, input is received from, and provided to, other associated media campaigns (e.g., print, online, and/or telephonic) so as to allow rapid and effective coordination between the campaigns. Mechanisms for improving user engagement to the secondary content are also disclosed.

21 Claims, 12 Drawing Sheets

(56) References Cited

U.S. PATENT DOCUMENTS

| | | |
|---|---|---|
| 5,497,185 A | 3/1996 | Dufresne et al. |
| 5,600,364 A | 2/1997 | Hendricks et al. |
| 5,758,257 A | 5/1998 | Herz et al. |
| 5,774,170 A | 6/1998 | Hite et al. |
| 5,793,409 A | 8/1998 | Tetsumura |
| 5,812,642 A | 9/1998 | Leroy |
| 5,914,945 A | 6/1999 | Abu-Amara et al. |
| 5,929,849 A * | 7/1999 | Kikinis .................. 725/113 |
| 5,956,037 A * | 9/1999 | Osawa et al. .............. 345/418 |
| 5,974,299 A | 10/1999 | Massetti |
| 6,002,393 A | 12/1999 | Hite et al. |
| 6,029,045 A | 2/2000 | Picco et al. |
| 6,047,327 A | 4/2000 | Tso et al. |
| 6,081,830 A | 6/2000 | Schindler |
| 6,088,722 A | 7/2000 | Herz et al. |
| 6,134,532 A | 10/2000 | Lazarus et al. |
| 6,161,142 A | 12/2000 | Wolfe et al. |
| 6,182,050 B1 | 1/2001 | Ballard |
| 6,202,210 B1 | 3/2001 | Ludtke |
| 6,216,129 B1 | 4/2001 | Eldering |
| 6,272,176 B1 | 8/2001 | Srinivasan |
| 6,282,713 B1 * | 8/2001 | Kitsukawa et al. ............. 725/36 |
| 6,446,261 B1 | 9/2002 | Rosser |
| 6,463,585 B1 | 10/2002 | Hendricks et al. |
| 6,467,089 B1 | 10/2002 | Aust et al. |
| 6,502,076 B1 * | 12/2002 | Smith ................. 705/14.54 |
| 6,560,578 B2 | 5/2003 | Eldering |
| 6,604,138 B1 | 8/2003 | Virine et al. |
| 6,615,039 B1 | 9/2003 | Eldering |
| 6,615,251 B1 | 9/2003 | Klug et al. |
| 6,647,548 B1 | 11/2003 | Lu et al. |
| 6,671,736 B2 | 12/2003 | Virine et al. |
| 6,681,393 B1 | 1/2004 | Bauminger et al. |
| 6,704,930 B1 | 3/2004 | Eldering et al. |
| 6,718,551 B1 | 4/2004 | Swix et al. |
| 6,738,978 B1 | 5/2004 | Hendricks et al. |
| 6,771,290 B1 | 8/2004 | Hoyle |
| 6,901,606 B2 | 5/2005 | Wright et al. |
| 6,909,837 B1 | 6/2005 | Unger |
| 7,039,928 B2 | 5/2006 | Kamada et al. |
| 7,075,945 B2 | 7/2006 | Arsenault et al. |
| 7,100,183 B2 | 8/2006 | Kunkel et al. |
| 7,143,431 B1 | 11/2006 | Eager et al. |
| 7,146,627 B1 | 12/2006 | Ismail et al. |
| 7,152,237 B2 | 12/2006 | Flickinger et al. |
| 7,155,508 B2 | 12/2006 | Sankuratripati et al. |
| 7,174,126 B2 | 2/2007 | McElhatten |
| 7,197,472 B2 | 3/2007 | Conkwright et al. |
| 7,222,078 B2 | 5/2007 | Abelow |
| 7,228,555 B2 | 6/2007 | Schlack |
| 7,237,250 B2 | 6/2007 | Kanojia et al. |
| 7,246,150 B1 | 7/2007 | Donoho et al. |
| 7,246,172 B2 | 7/2007 | Yoshiba et al. |
| 7,280,737 B2 | 10/2007 | Smith |
| 7,317,728 B2 | 1/2008 | Acharya |
| 7,327,692 B2 | 2/2008 | Ain et al. |
| 7,352,775 B2 | 4/2008 | Powell |
| 7,355,980 B2 | 4/2008 | Bauer et al. |
| 7,356,751 B1 | 4/2008 | Levitan |
| 7,363,371 B2 | 4/2008 | Kirkby et al. |
| 7,363,643 B2 | 4/2008 | Drake et al. |
| 7,457,520 B2 | 11/2008 | Rossetti et al. |
| 7,577,118 B2 | 8/2009 | Haumonte et al. |
| 7,602,820 B2 | 10/2009 | Helms |
| 7,603,529 B1 | 10/2009 | MacHardy et al. |
| 7,720,432 B1 | 5/2010 | Colby et al. |
| 7,729,940 B2 * | 6/2010 | Harvey et al. ................ 705/7.31 |
| 7,730,509 B2 | 6/2010 | Boulet |
| 7,801,803 B2 * | 9/2010 | Forlai ...................... 705/37 |
| 7,954,131 B2 | 5/2011 | Cholas et al. |
| 8,028,322 B2 | 9/2011 | Riedl et al. |
| 8,042,131 B2 | 10/2011 | Flickinger |
| 8,065,703 B2 | 11/2011 | Wilson |
| 8,099,757 B2 | 1/2012 | Riedl et al. |
| 8,205,226 B2 | 6/2012 | Ko et al. |
| 8,214,256 B2 | 7/2012 | Riedl et al. |
| 8,296,185 B2 * | 10/2012 | Isaac .................. 705/14.55 |
| 8,347,341 B2 | 1/2013 | Markley et al. |
| 8,365,213 B1 * | 1/2013 | Orlowski .................. 725/13 |
| 8,516,529 B2 * | 8/2013 | Lajoie et al. .................. 725/87 |
| 8,571,931 B2 | 10/2013 | Riedl et al. |
| 8,621,501 B2 * | 12/2013 | Matheny et al. ............... 725/23 |
| 8,769,559 B2 * | 7/2014 | Moon et al. .................. 725/23 |
| 2001/0013123 A1 | 8/2001 | Freeman et al. |
| 2002/0049902 A1 | 4/2002 | Rhodes |
| 2002/0078441 A1 | 6/2002 | Drake et al. |
| 2002/0078444 A1 | 6/2002 | Krewin et al. |
| 2002/0087975 A1 | 7/2002 | Schlack |
| 2002/0087976 A1 | 7/2002 | Kaplan et al. |
| 2002/0104083 A1 | 8/2002 | Hendricks et al. |
| 2002/0112240 A1 | 8/2002 | Bacso et al. |
| 2002/0120498 A1 | 8/2002 | Gordon |
| 2002/0123928 A1 | 9/2002 | Eldering et al. |
| 2002/0124182 A1 | 9/2002 | Bacso et al. |
| 2002/0144263 A1 | 10/2002 | Eldering et al. |
| 2002/0166119 A1 | 11/2002 | Cristofalo |
| 2002/0178445 A1 | 11/2002 | Eldering et al. |
| 2002/0178447 A1 | 11/2002 | Plotnick et al. |
| 2003/0004810 A1 | 1/2003 | Eldering |
| 2003/0033199 A1 | 2/2003 | Coleman |
| 2003/0056217 A1 | 3/2003 | Brooks |
| 2003/0093311 A1 | 5/2003 | Knowlson |
| 2003/0093784 A1 | 5/2003 | Dimitrova et al. |
| 2003/0093792 A1 | 5/2003 | Labeeb |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0110499 A1 | 6/2003 | Knudson |
| 2003/0145323 A1 | 7/2003 | Hendricks et al. |
| 2003/0149975 A1 * | 8/2003 | Eldering et al. ................ 725/34 |
| 2003/0172376 A1 * | 9/2003 | Coffin, III .................. 725/22 |
| 2003/0217365 A1 | 11/2003 | Caputo |
| 2004/0078809 A1 | 4/2004 | Drazin |
| 2004/0133467 A1 | 7/2004 | Siler |
| 2004/0138909 A1 * | 7/2004 | Mayer ....................... 705/1 |
| 2004/0148625 A1 | 7/2004 | Eldering et al. |
| 2004/0186774 A1 * | 9/2004 | Lee ...................... 705/14 |
| 2004/0199789 A1 * | 10/2004 | Shaw et al. ................. 713/201 |
| 2005/0034171 A1 | 2/2005 | Benya |
| 2005/0039205 A1 | 2/2005 | Riedl |
| 2005/0060742 A1 | 3/2005 | Riedl |
| 2005/0060745 A1 | 3/2005 | Riedl |
| 2005/0086691 A1 | 4/2005 | Dudkiewicz et al. |
| 2005/0114900 A1 | 5/2005 | Ladd |
| 2005/0210502 A1 | 9/2005 | Flickinger et al. |
| 2005/0223409 A1 | 10/2005 | Rautila et al. |
| 2005/0229209 A1 | 10/2005 | Hildebolt et al. |
| 2005/0234998 A1 | 10/2005 | Lesandrini et al. |
| 2005/0289588 A1 | 12/2005 | Kinnear |
| 2006/0036750 A1 | 2/2006 | Ladd |
| 2006/0171390 A1 | 8/2006 | La Joie |
| 2006/0171423 A1 | 8/2006 | Helms |
| 2006/0190336 A1 | 8/2006 | Pisaris-Henderson et al. |
| 2006/0218604 A1 | 9/2006 | Riedl |
| 2006/0248555 A1 | 11/2006 | Eldering |
| 2006/0253328 A1 | 11/2006 | Kohli et al. |
| 2006/0253584 A1 | 11/2006 | Dixon et al. |
| 2006/0253864 A1 | 11/2006 | Easty |
| 2006/0277569 A1 | 12/2006 | Smith |
| 2006/0288374 A1 * | 12/2006 | Ferris et al. .................. 725/62 |
| 2006/0294259 A1 | 12/2006 | Matefi et al. |
| 2007/0022459 A1 | 1/2007 | Gaebel, Jr. et al. |
| 2007/0029379 A1 * | 2/2007 | Peyer ..................... 235/382 |
| 2007/0033531 A1 | 2/2007 | Marsh |
| 2007/0074258 A1 | 3/2007 | Wood et al. |
| 2007/0076728 A1 | 4/2007 | Rieger et al. |
| 2007/0089127 A1 | 4/2007 | Flickinger et al. |
| 2007/0094691 A1 | 4/2007 | Gazdzinski |
| 2007/0113243 A1 | 5/2007 | Brey |
| 2007/0150919 A1 | 6/2007 | Morishita |
| 2007/0157242 A1 | 7/2007 | Cordray et al. |
| 2007/0217436 A1 | 9/2007 | Markley |
| 2007/0233857 A1 | 10/2007 | Cheng et al. |
| 2007/0244760 A1 | 10/2007 | Bodnar et al. |

(56) References Cited

U.S. PATENT DOCUMENTS

| | | |
|---|---|---|
| 2007/0276926 A1 | 11/2007 | LaJoie |
| 2008/0092181 A1 | 4/2008 | Britt |
| 2008/0147497 A1 | 6/2008 | Tischer |
| 2008/0192820 A1 | 8/2008 | Brooks |
| 2008/0229354 A1 | 9/2008 | Morris et al. |
| 2008/0263578 A1 | 10/2008 | Bayer et al. |
| 2008/0271068 A1 | 10/2008 | Ou et al. |
| 2008/0273591 A1 | 11/2008 | Brooks |
| 2008/0313691 A1 | 12/2008 | Cholas et al. |
| 2009/0030802 A1 | 1/2009 | Plotnick et al. |
| 2009/0132346 A1 | 5/2009 | Duggal et al. |
| 2009/0187939 A1 | 7/2009 | Lajoie |
| 2009/0210899 A1 | 8/2009 | Lawrence-Apfelbaum et al. |
| 2009/0320059 A1 | 12/2009 | Bolyukh |
| 2010/0161492 A1 | 6/2010 | Harvey et al. |
| 2010/0251304 A1 | 9/2010 | Donoghue et al. |
| 2010/0251305 A1 | 9/2010 | Kimble et al. |
| 2010/0262488 A1* | 10/2010 | Harrison et al. ........... 705/14.46 |
| 2010/0269131 A1 | 10/2010 | Newberry et al. |
| 2010/0313225 A1 | 12/2010 | Cholas et al. |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0093900 A1 | 4/2011 | Patel et al. |
| 2011/0103374 A1 | 5/2011 | Lajoie et al. |
| 2011/0107364 A1 | 5/2011 | Lajoie et al. |
| 2011/0107379 A1 | 5/2011 | Lajoie et al. |
| 2011/0178880 A1 | 7/2011 | Karaoguz et al. |
| 2011/0231265 A1 | 9/2011 | Brown et al. |
| 2011/0307339 A1 | 12/2011 | Russell et al. |
| 2011/0317977 A1 | 12/2011 | Harris |
| 2012/0011269 A1 | 1/2012 | Krikorian et al. |
| 2012/0084813 A1 | 4/2012 | Dmitriev et al. |
| 2012/0110620 A1 | 5/2012 | Kilar et al. |
| 2014/0020017 A1 | 1/2014 | Stern et al. |

* cited by examiner

APPARATUS AND METHODS FOR MULTIMEDIA COORDINATION

RELATED APPLICATIONS

The present disclosure is related to commonly owned U.S. patent application Ser. No. 12/284,757 filed on Sep. 24, 2008 and entitled "METHODS AND APPARATUS FOR TARGETED SECONDARY CONTENT INSERTION", commonly owned U.S. Pat. No. 8,099,757 issued on Jan. 17, 2012 and entitled "METHODS AND APPARATUS FOR REVENUE-OPTIMIZED DELIVERY OF CONTENT IN A NETWORK", commonly owned U.S. patent application Ser. No. 12/503,772 filed Jul. 15, 2009 and entitled "METHODS AND APPARATUS FOR CLASSIFYING AN AUDIENCE IN A CONTENT-BASED NETWORK", which is patented as U.S. Pat. No. 8,935,721 on Jan. 13, 2015, commonly owned U.S. patent application Ser. No. 12/503,710 filed Jul. 15, 2009 and entitled "METHODS AND APPARATUS FOR TARGETED SECONDARY CONTENT INSERTION", which is patented as U.S. Pat. No. 8,813,124 on Aug. 19, 2014, commonly owned U.S. Provisional patent application Ser. No. 61/670,082 filed on Jul. 10, 2012 and entitled "APPARATUS AND METHODS FOR SELECTIVE ENFORCEMENT OF SECONDARY CONTENT VIEWING", now U.S. patent application Ser. No. 13/676,012 tiled on Nov. 13, 2012 and entitled "APPARATUS AND METHODS FOR SELECTIVE ENFORCEMENT OF SECONDARY CONTENT VIEWING", and commonly owned U.S. patent application Ser. No. 12/503,749 filed on Jul. 15, 2009, and entitled "METHODS AND APPARATUS FOR EVALUATING AN AUDIENCE IN A CONTENT-BASED NETWORK" each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The disclosure relates generally to the field of data and content distribution and delivery via a content distribution or other network. In one exemplary aspect, the disclosure relates to the selective delivery of supplemental or secondary content such as advertising or promotions.

2. Description of Related Technology

Today, advertisers expend vast sums of money to advertise over television programming delivery mechanisms (e.g., over-the-air broadcast, cable, satellite, etc.), as well as in complementary mechanisms such as print media (magazines, newspapers, etc.), and online via the Internet (e.g., banner advertisements on websites, video clip advertisements, e-mail campaigns, Internet radio station spots, etc.). In many cases, promotions and discounts are offered with the objective to more effectively market the advertiser's brand/product to consumers. Advertisers also expend significant capital to obtain metrics data related to these advertising campaigns, which can provide feedback on the effectiveness of such campaigns, and consumer interest in the offered products or services.

However, advertising through these different media has traditionally been very segregated. For a given advertiser, there has been no linking between campaigns delivered through the different media, and no correlation of metrics from different media is generally utilized, even though the different media campaigns may target the same consumer households.

Print and Internet campaigns often offer discounts and promotions, either through printed coupons or electronic coupons, as incentive for consumers to try their products. Using these promotions and discounts, advertisers also collect and track various types of "performance" metrics data, However, data collected from these discount campaigns are largely disjoint from and uncorrelated to the television campaigns, even though they are from the same manufacturer/service provider.

Additionally, consumers (including television users or subscribers) are becoming less engaged over time in many facets of advertising, due in part to the ability to bypass them whether by FF functions or the like, tuning away, or simply walking away to do other things. The same is true of video commercials and so-called "infomercials". Many users simply switch away or otherwise "tune out" advertisements, which subrogates the effectiveness of the advertisement or promotion.

Hence, there is a need for improved methods and apparatus which provide enhanced correlation and coordination between various advertising media campaigns.

Moreover, there is a need to increase the engagement or interest level of the user with respect to advertisements and promotions, regardless which sort of media outlet or campaign is utilized.

SUMMARY

The foregoing needs are addressed herein by providing, inter alia, methods and apparatus for enhancing coordination between multiple media advertising or promotion campaigns.

In a first aspect, a method for coordinated advertising campaign management is disclosed. In one embodiment, the method includes providing a user-side application which collects data regarding user interactions with advertising, and provides the data to a network entity for further evaluation or distribution (e.g., to advertisers or other third parties). The data can allow for coordination between television, print, and electronic (e.g., email or Internet) campaigns being run in parallel, such as for the same or similar goods or services, including the provision of coupons and discounts. The data may also comprise recommendations or actions to be taken with respect to the other campaigns.

In a second aspect, an architecture for coordinated advertising or promotion campaign management is disclosed. In one embodiment, the architecture utilizes managed content distribution network (e.g., cable television or satellite) assets including a network server and database and subscriber's CPE to obtain data regarding a user's behavior and interaction with certain secondary content. In one variant, input from other media campaigns (e.g., online and print) relating to user activity is also used along with the CPE-derived data to generate integrated metrics and return on investment (ROI) data for use in, inter alia, adjusting one or more of the campaigns.

In a third aspect, a computer readable apparatus is disclosed. In one embodiment, the apparatus includes a storage medium with an application program stored thereon, the program configured to obtain user behavior and interactivity data with respect to one or more secondary content elements.

In a fourth aspect, a consumer premises device is disclosed. In one embodiment, the device includes an interface for communication with a managed network, and includes an application running thereon configured to obtain user interaction data relating to secondary content delivered over the network.

In a fifth aspect, a consumer mobile device is disclosed. In one embodiment, the device includes a wireless air interface for communication with a premises device, the latter in communication with a managed network. The mobile device includes an application running thereon configured to obtain user interaction data relating to secondary content delivered over the network and to the mobile device and rendered thereon.

In a sixth aspect, a network server is disclosed. In one embodiment, the server includes logic operative to receive data relating to one or multiple user's interactions with secondary content from respective CPE of the user(s), and process the data for use by a third party entity for, inter cilia, managing an online or print media campaign relating to the secondary content.

In a seventh aspect, a method of compensating a network user is disclosed. In one embodiment, the method includes: evaluating a user's behavior with respect to at least one criterion for at least one secondary content element; and based at least in part on the evaluating, providing the user at least one form of consideration for their behavior that meets the at least one criterion.

In an eighth aspect, a premises network architecture is disclosed. In one embodiment, the architecture comprises: a leased user premises device configured for communication with a managed content distribution network; a wireless access point in data communication with or part of the leased user premises device; a wireless-enabled consumer mobile device configured for wireless communication with the access point, the mobile device further comprising an application running thereon configured to: obtain user input or interaction data relating to an advertisement or promotion delivered from the managed network and rendered on the mobile device; and forward at least a portion of the obtained data to a network entity of the managed network via the leased premises device and the access point.

In a ninth aspect, a user device configured to obtain data relating to interaction with one or more secondary content elements associated with a first program stream by a user thereof is disclosed. In on embodiment, the user device comprises: a network interface configured to receive the one or more secondary content elements associated with the first program stream; a storage device; and a processor in data communication with the network interface, the processor configured to run at least one computer program thereon, the computer program comprising a plurality of instructions which are configured to, when executed: obtain data from one or more input devices associated with the user device, the data comprising information relating to an initiation of a trick mode functionality with respect to a first one of the one or more secondary content elements associated with the first program stream; forward the obtained data to a network entity via the network interface; receive a determination from the network entity that the first one of the secondary content elements is ineffective based, at least in part, on the obtained data relating to the initiation of the trick mode functionality; and based, at least in part, on the reception of the determination that the first one of the secondary content elements is ineffective, receive a second program stream configured to have the first one of the one or more secondary content elements replaced with a second one of the one or more secondary content elements.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 1$a$ is a functional block diagram illustrating one exemplary HFC cable network headend configuration useful with the various aspects of the present disclosure.

FIG. 1$b$ is a functional block diagram illustrating one exemplary local service node configuration useful with the various aspects of the present disclosure.

FIG. 1$c$ is a functional block diagram illustrating one exemplary broadcast switched architecture (BSA) network useful with the various aspects of the present disclosure.

FIG. 1$d$ is a functional block diagram illustrating one exemplary packetized content delivery network architecture useful with the various aspects of the present disclosure.

FIG, 2 is a high-level block diagram illustrating one embodiment of a network-centric media campaign coordination architecture.

Figure 2:
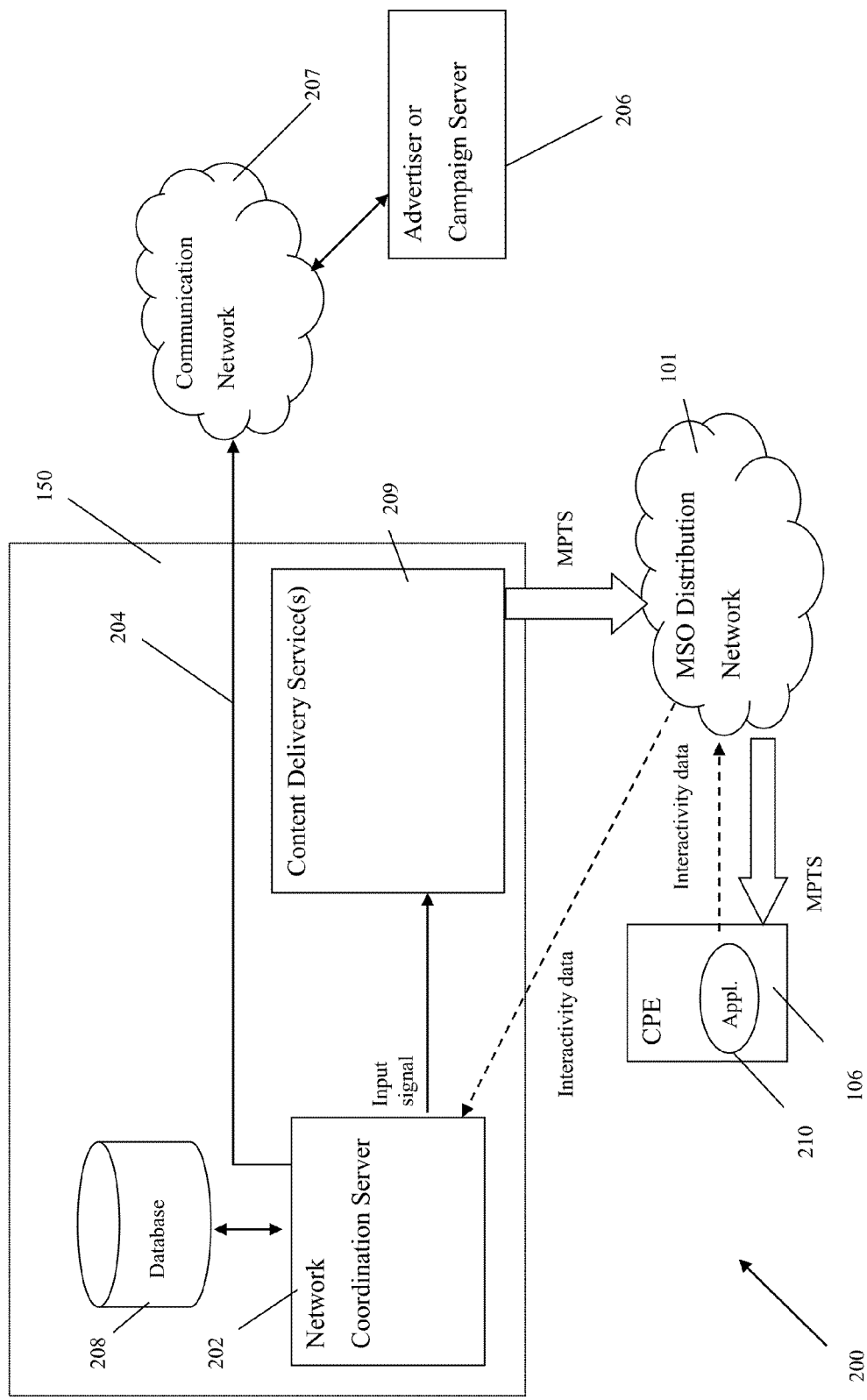

FIG. 2$a$ is a high-level block diagram illustrating another embodiment of a network-centric media campaign coordination architecture, wherein some data collection functions are performed by one or more network entities.

Figure 3:
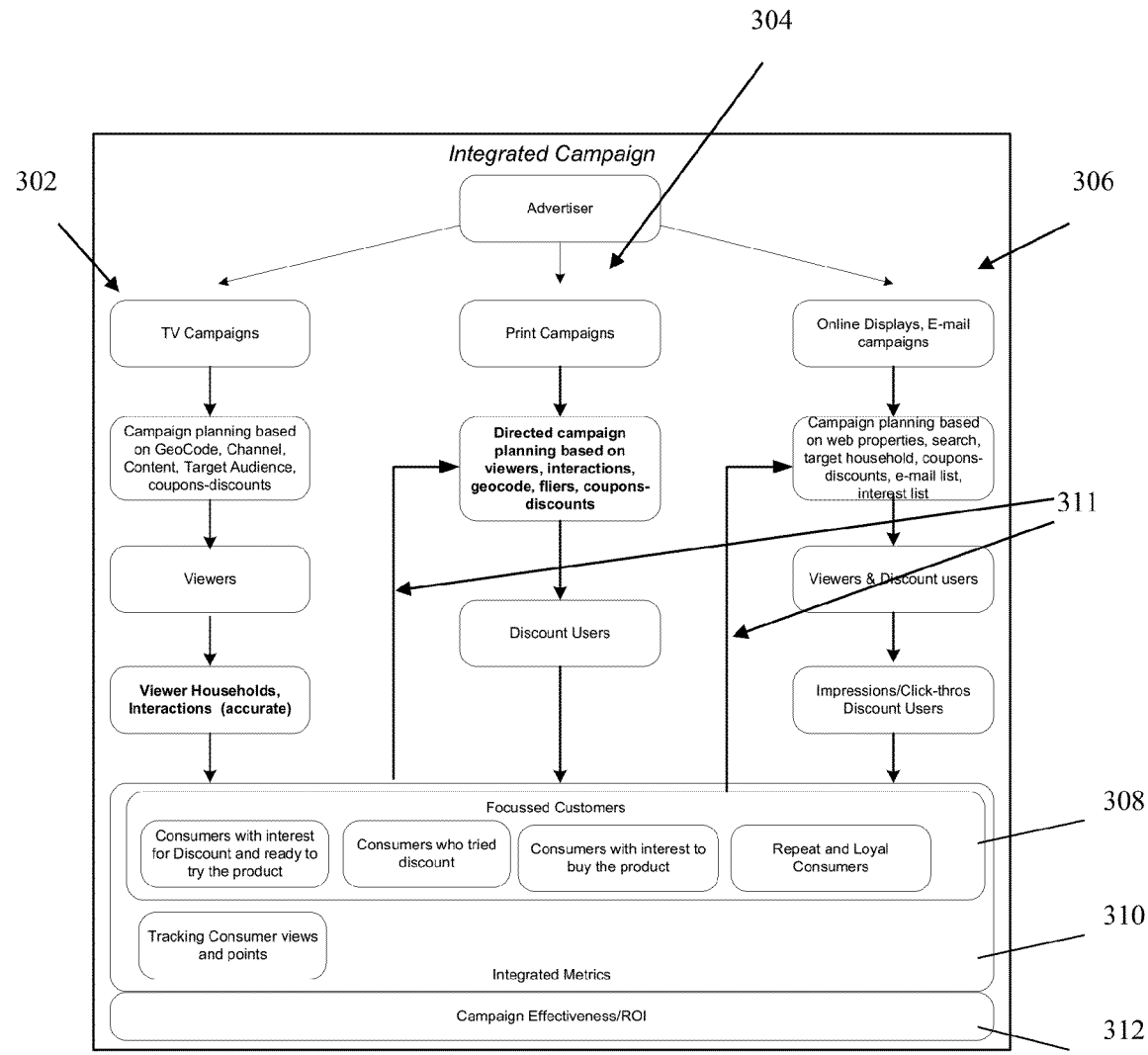

FIG. 3 is a graphical representation of one embodiment of a coordinated advertising campaign management technique.

Figure 4:
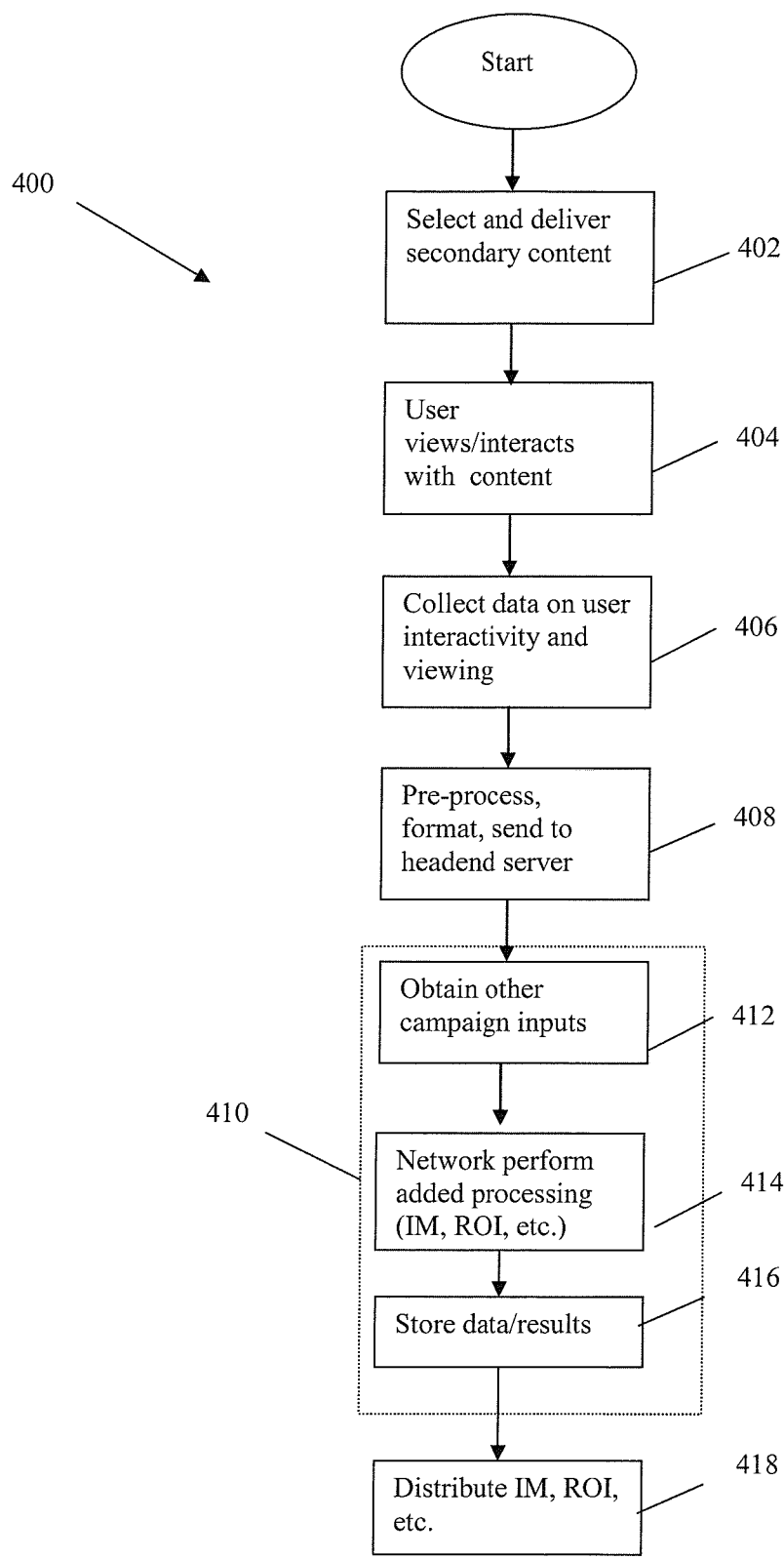

FIG. 4 is a flow diagram illustrating a first embodiment of a method of selectively media campaign coordination.

Figure 5:
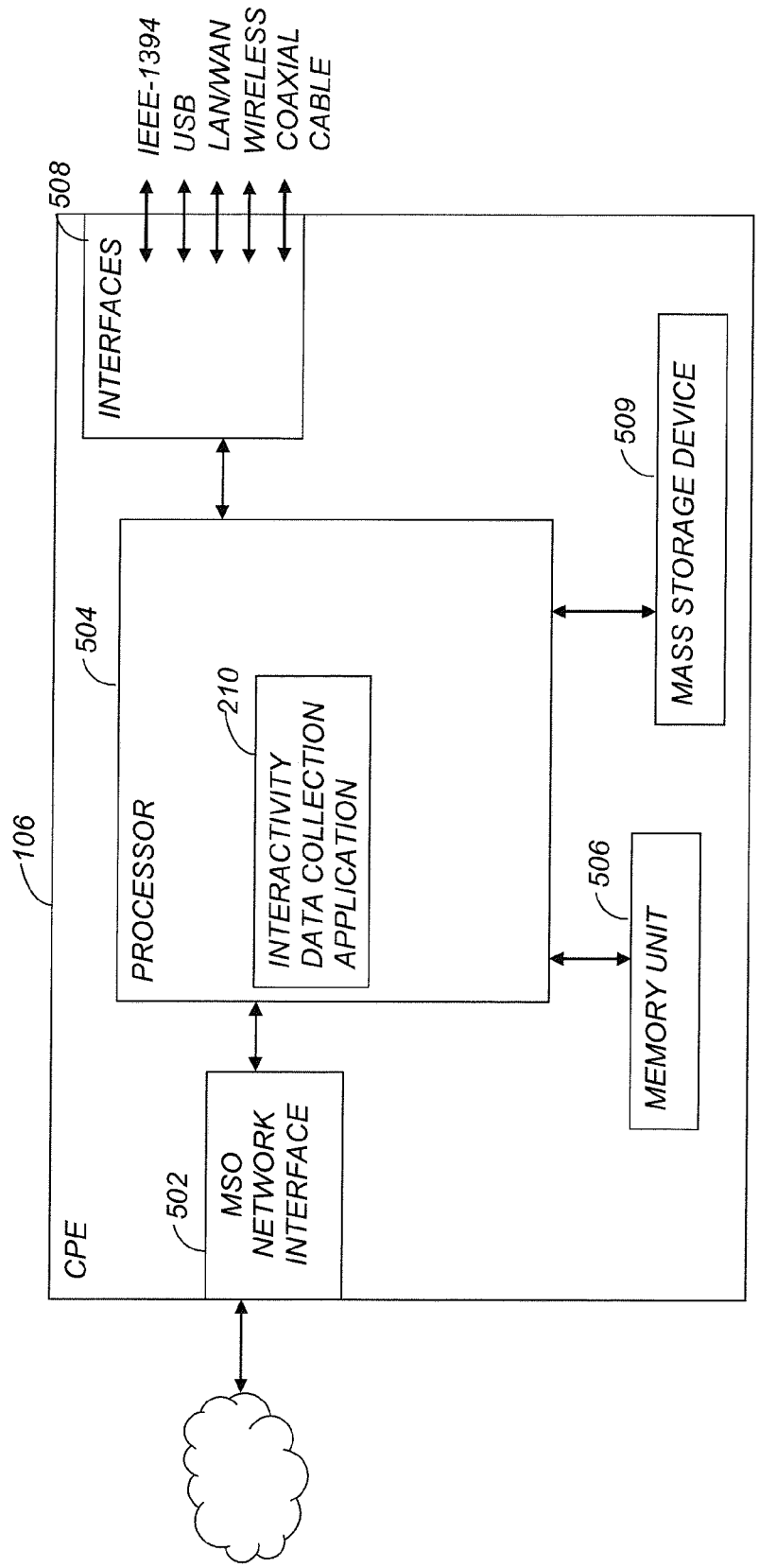

FIG. 5 is a functional block diagram illustrating an exemplary embodiment of CPE adapted to support user interactivity data collection.

Figure 6:
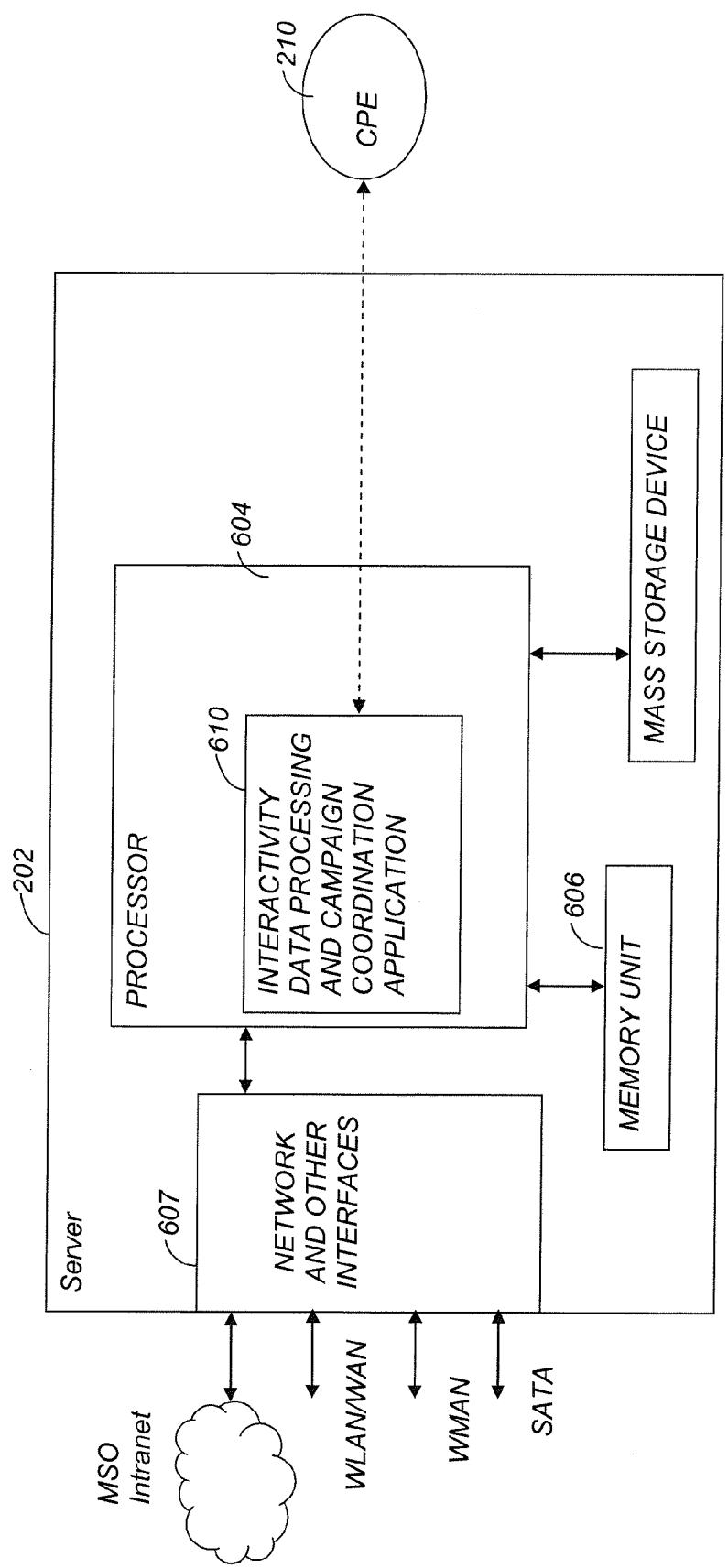

FIG. 6 is a functional block diagram illustrating an exemplary embodiment of a network server configured to support user interactivity data collection and processing, and media campaign coordination.

All FIGS. © Copyright 2012 Time Warner Cable, Inc. All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java XIet™ that runs within the JavaTV™ environment.

As used herein, the terms "client device" and "end user device" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "consideration" refers without limitation to any payment, compensation, bargain, barter, release, option, or other arrangement wherein something of actual, perceived or potential future value (whether by an objective or subjective standard) is given, assigned, transferred or exchanged. For example, one form of consideration is a monetary payment. Another comprises an exchange of services. Yet another comprises release from an obligation or debt. Still another four comprises a subscription or installment plan. Yet a further form comprises providing a limited time option. Myriad other forms of consideration will be appreciated by those of ordinary skill given the present disclosure.

The terms "Consumer Premises Equipment (CPE)" and "host device" refer without limitation to any type of electronic equipment located within a consumer's or user's premises and connected to a network. The term "host device" includes terminal devices that have access to digital television content via a satellite, cable, or terrestrial network. The host device functionality may be integrated into a digital television (DTV) set, The term "consumer premises equipment" (CPE) includes such electronic equipment such as set-top boxes, televisions, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multifunction system.

As used herein, the terms "service", "content", and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "DOCSIS" refers to any of the existing or planned variants of the Data Over Cable Services Interface Specification, including for example DOCSIS versions 1.0, 1.1, 2.0 and 3.0.

As used herein, the term gateway includes, without limitation, devices configured to interface with a network, and pass signals to or exchange signals with, another device in communication therewith. Various exemplary gateways are described in, inter alia, co-owned and co-pending U.S. patent application Ser. No. 11/818,236 filed on Jun. 13, 2007 entitled "PREMISES GATEWAY APPARATUS AND METHODS FOR USE IN A CONTENT-BASED NETWORK", U.S. patent application Ser. No. 12/582,619 filed on Oct. 20, 2009 and entitled "GATEWAY APPARATUS AND METHODS FOR DIGITAL CONTENT DELIVERY IN A NETWORK", and U.S. patent application Ser. No. 12/480,597 filed on Jun. 8, 2009 and entitled "MEDIA BRIDGE APPARATUS AND METHODS", each of the foregoing being incorporated herein by reference in its entirety.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer without limitation to a cable, fiber to the home (FTTH), fiber to the curb (FTTC), satellite, Hybrid Fiber Copper (HFCu), or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, HFCu networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols.

As used herein, the term "interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-AJTD-LTE, GSM, etc.) or IrDA families.

As used herein, the term "node" refers to any functional entity associated with a network, such as for example an OLT or ONU, whether physically discrete or distributed across multiple locations.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "secondary content" refers without limitation to advertisements, promotions, infomercials, trailers, or any other content which is presented before, during, after, or contemporaneous with, primary content such as e.g., movies, video segments, television programs, documentaries, etc.

As used herein, the term "serve" refers to any computerized component, system or entity regardless of form which is adapted to provide data, files, applications, content, or other services to one or more other devices or entities on a computer system or network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11 a/b/g/n/s/v or 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, RFID, NFC, acoustic, and infrared (i.e., IrDA).

Detailed Description of Exemplary Embodiments

Exemplary embodiments of secondary content data collection and media campaign integration apparatus and methods of are now described in detail. While these exemplary embodiments are described in the context of a hybrid fiber coax (HFC) cable architecture having a multiple systems operator (MSO), digital networking capability, and plurality of client devices/CPE, the general principles and advantages of the disclosure may be extended to other types of networks and architectures, whether broadband, narrowband, wired or wireless, content or data, or otherwise. Hence, the following description is merely exemplary in nature. For example, the various aspects of the disclosure may be practiced over a fiber-to-the-home (FTTH) or fiber-to-the-curb (FTTC) system, or over satellite or millimeter wave-based networks having two-way capabilities similar to today's digital cable HFC networks.

It will also be appreciated that while described generally in the context of a network providing service to a customer or consumer (i.e., residential) end user domain, the various aspects of the present disclosure may be readily adapted to other types of environments including, e.g., commercial/enterprise, and government/military applications. Myriad other applications are possible.

Also, while certain aspects are described primarily in the context of the well known IP or Internet Protocol (described in, inter alia, RFC 791 and 2460), other types of protocols (and in fact bearer networks to include other internets and intranets) may be used to implement the described functionality.

Bearer Network Architecture

Figure 1:
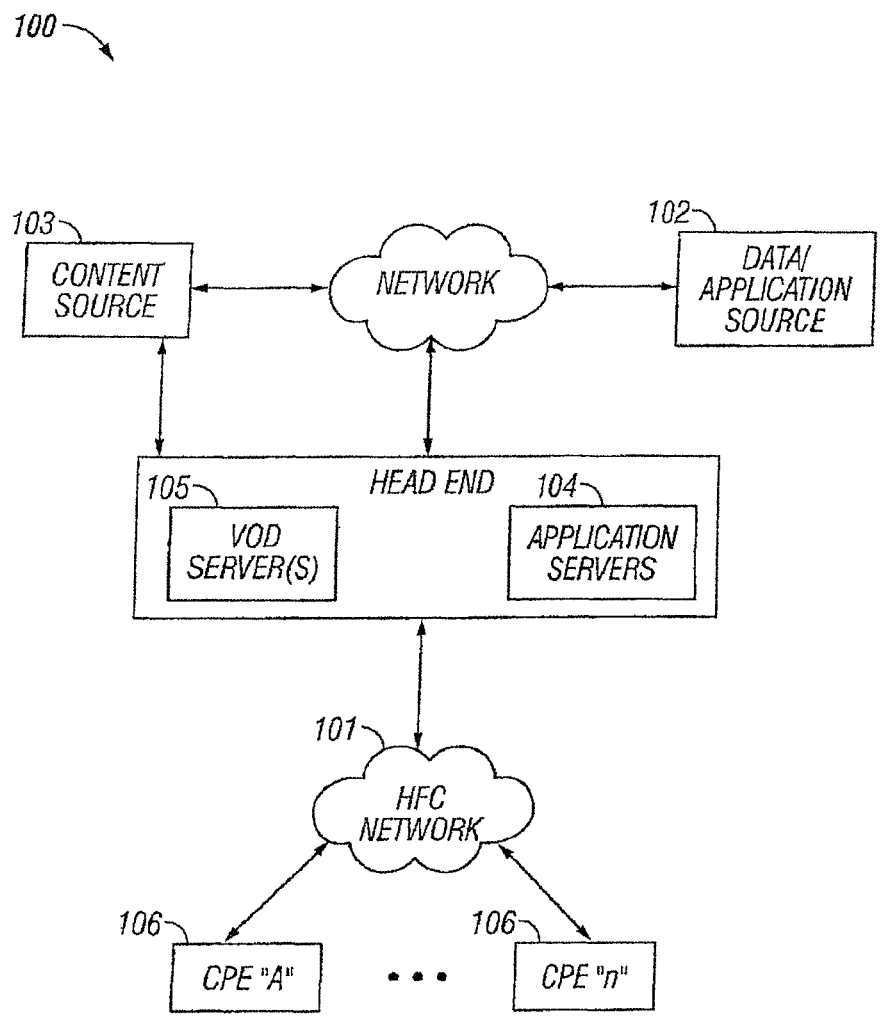
FIG. 1 is a functional block diagram illustrating an exemplary HFC cable network configuration useful with the various aspects of the present disclosure.

FIG. 1 illustrates a typical content distribution network configuration with which the apparatus and methods of the present disclosure may be used. The various components of the network 100 include (i) one or more data and application origination points 102; (ii) one or more content sources 103, (iii) one or more application distribution servers 104; (iv) one or more VoD servers 105, and (v) consumer premises equipment (CPE) 106. The distribution server(s) 104, VoD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VoD servers, and/or CPE devices (as well as different network topologies) may be utilized consistent with the disclosure. For example, the headend architecture of FIG. 1*a* (described in greater detail below) may be used.

The data/application origination point 102 comprises any medium that allows data and/or applications (such as a VoD-based application, gaming application, or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VoD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the servers 104, 105) that can be accessed by a distribution server 104 or VOD server 105.

Figure 1A:
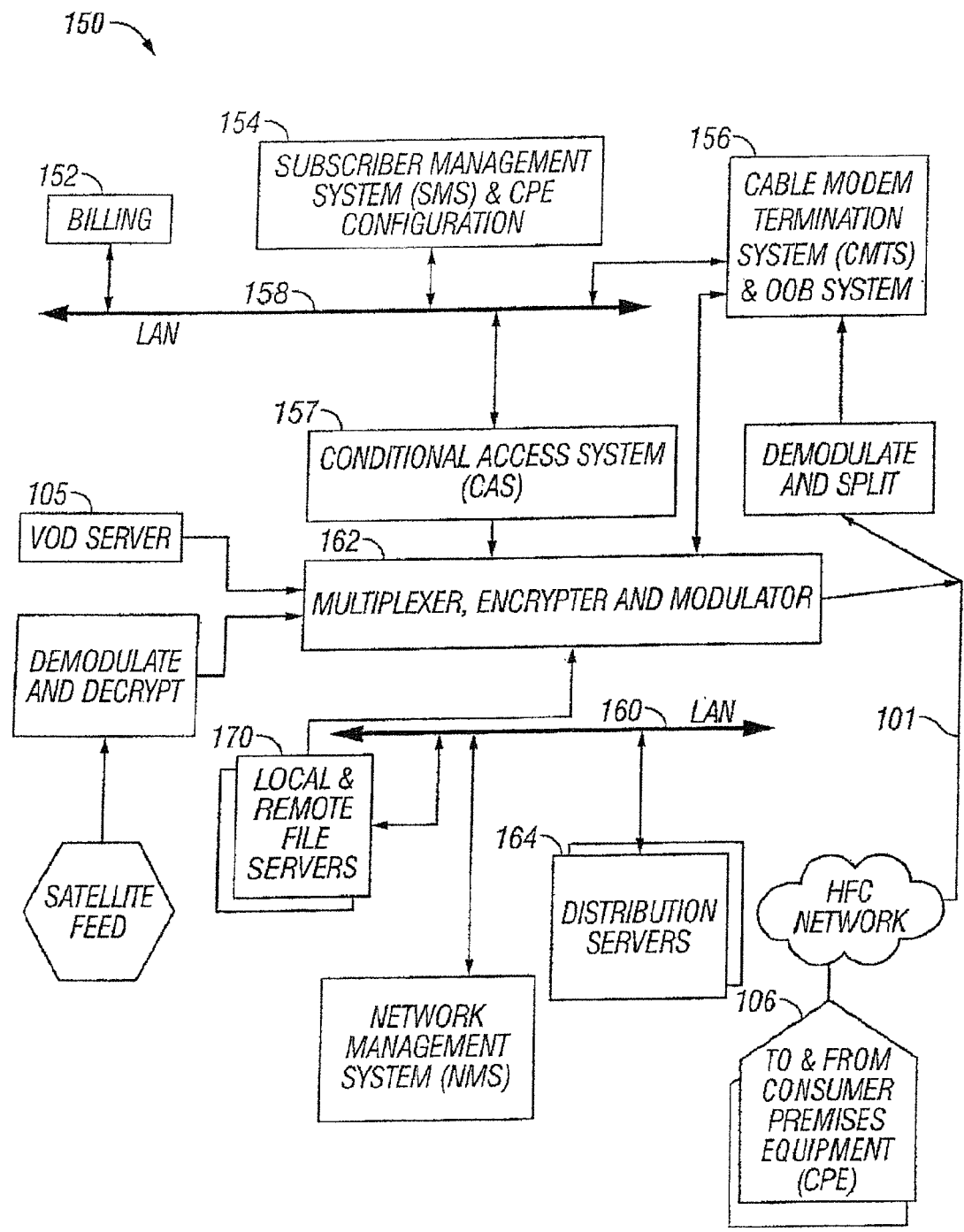

Referring now to FIG. 1*a*, one exemplary embodiment of headend architecture useful with the present disclosure is described. As shown in FIG. 1*a*, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture and that each MSO may have multiple headends deployed using custom architectures.

The architecture 150 of FIG. 1a further includes a multiplexer/encrypter/modulator (MEM) 162 coupled to the HFC network 101 adapted to "condition" content for transmission over the network. The distribution servers 164 are coupled to the LAN 160, which provides access to the MEM 162 and network 101 via one or more file servers 170. The VoD servers 105 are coupled to the LAN 160 as well, although other architectures may be employed (such as for example where the VoD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend and sent to neighborhood hubs (FIG. 1b) via a variety of interposed network components.

Content (e.g., audio, video, data, applications, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the disclosure is in no way limited to these approaches.

Figure 1B:
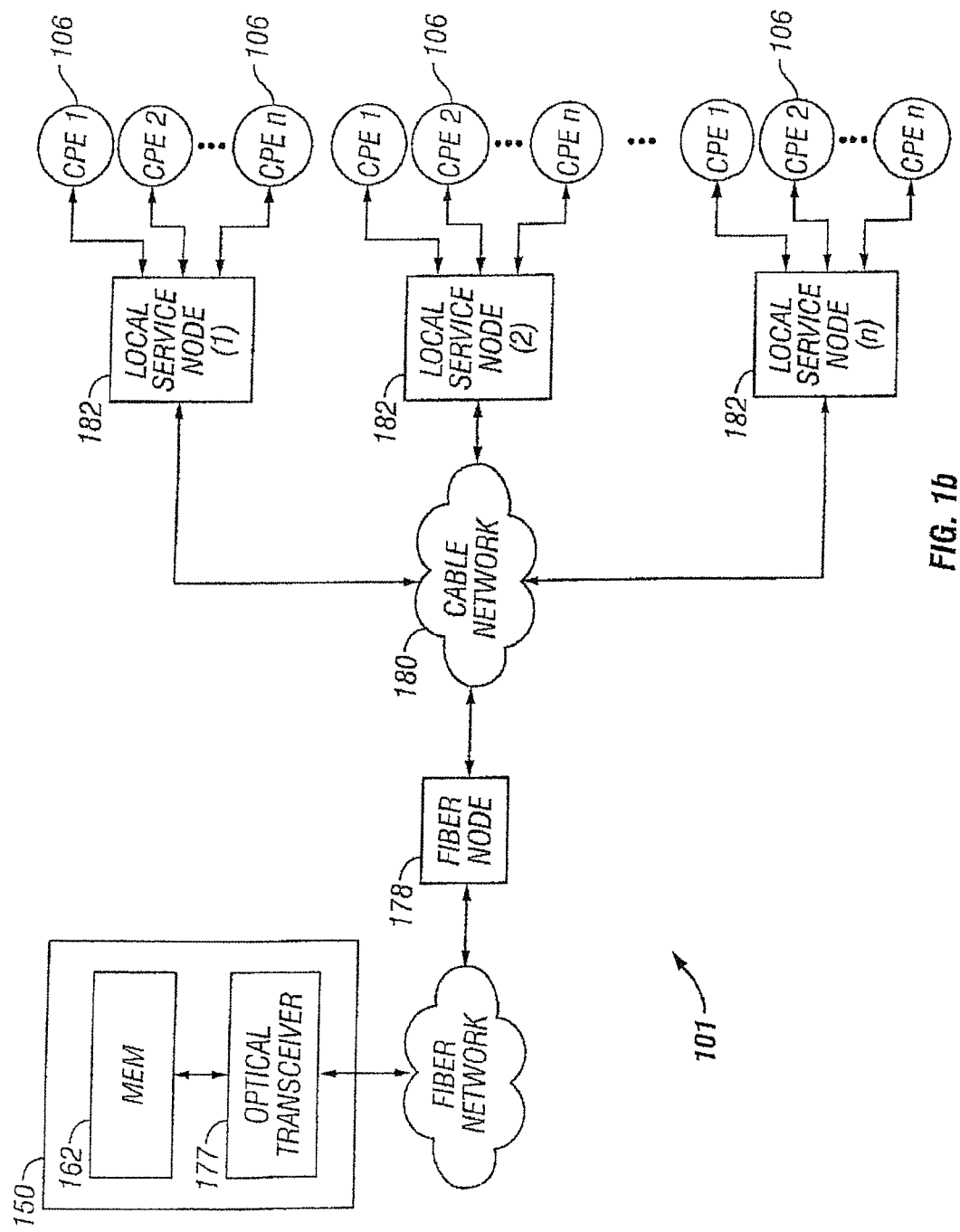

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the headend or further downstream). The optical domain signals are then distributed to a fiber node 178, which further distributes the signals over a distribution network 180 to a plurality of local servicing nodes 182. This provides an effective 1:N expansion of the network at the local service end.

"Switched" Networks

Figure 1C:
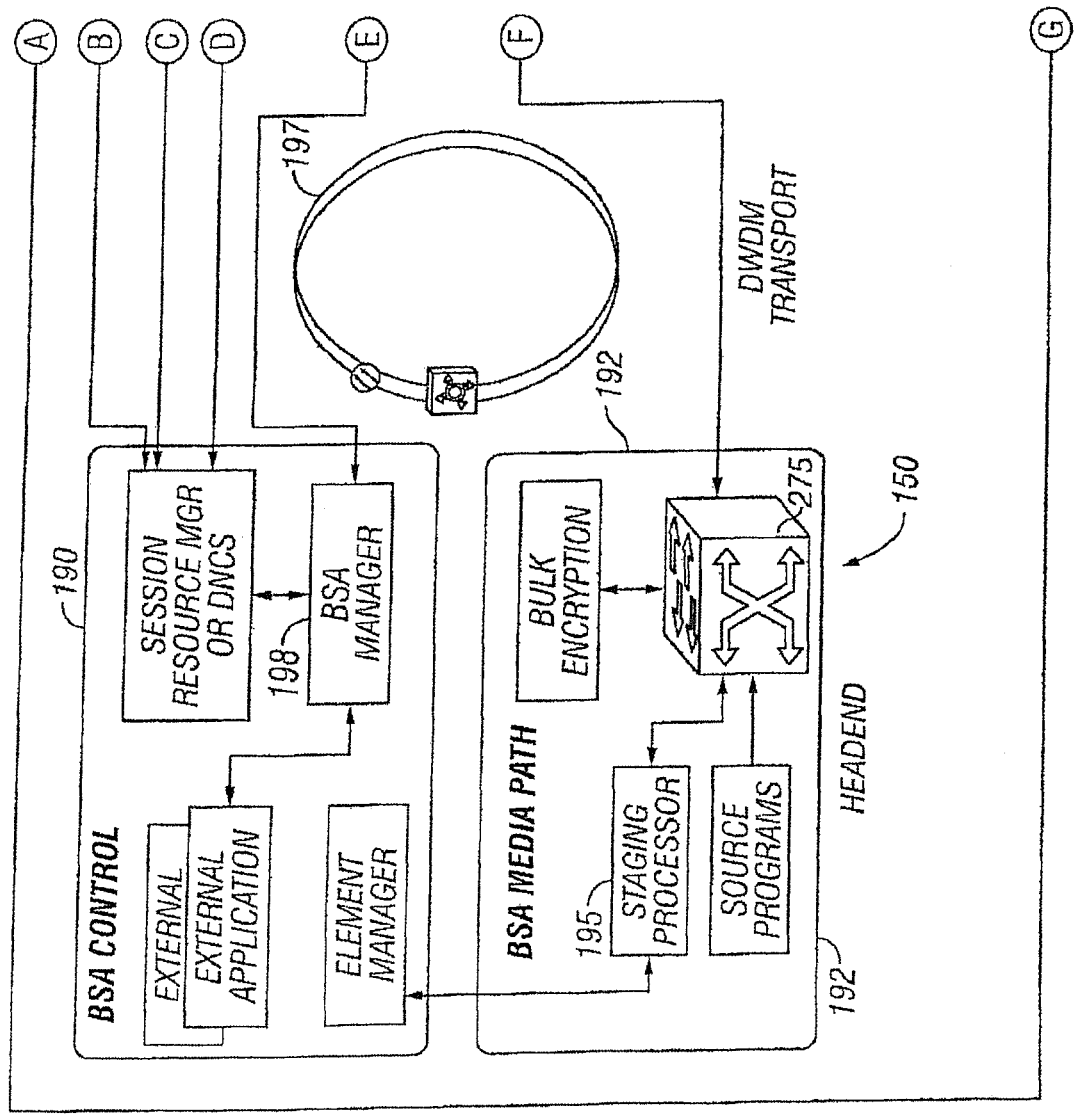
Figure 1C:
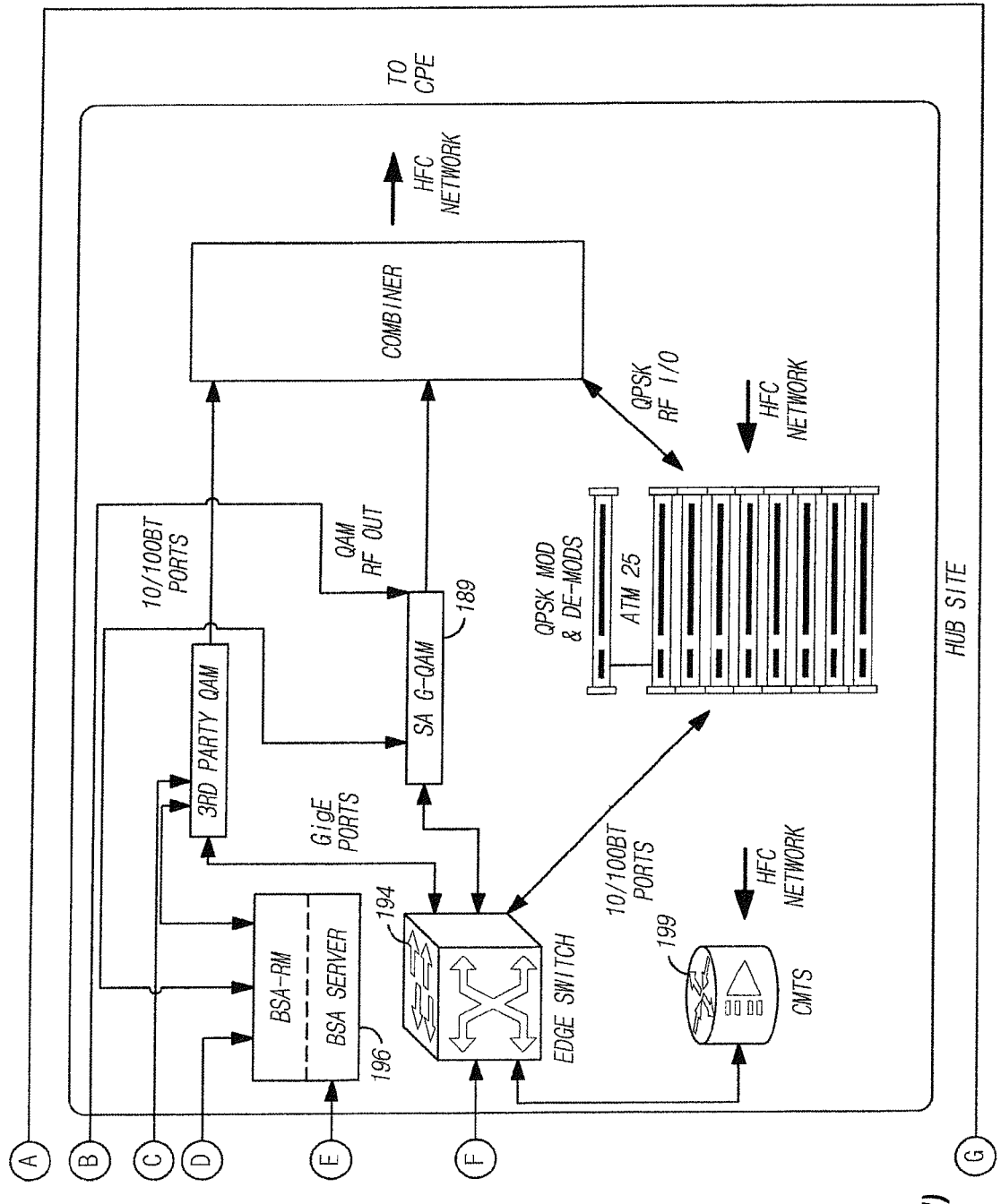

FIG. 1c illustrates an exemplary "switched" network architecture also useful with the present disclosure. Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also typically disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "Technique for Effectively Providing Program Material in a Cable Television System", incorporated herein by reference in its entirety, describes one exemplary broadcast switched digital architecture useful with the present disclosure, although it will be recognized by those of ordinary skill that other approaches and architectures may be substituted.

In addition to "broadcast" content (e.g., video programming), the systems of FIGS. 1a-1c can also deliver Internet data services using the Internet protocol (IP), although other protocols and transport mechanisms of the type well known in the digital communication art may be substituted. One exemplary delivery paradigm comprises delivering MPEG-based video content (e.g., "IPTV" or the like), with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable or other modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component. The edge switch 194 forwards the packets receive from the CMTS 199 to the QAM modulator 189, which transmits the packets on one or more physical (QAM-modulated RF) channels to the CPEs (or CD). The IP packets are typically transmitted on RF channels that are different than the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Packet-Optimized Architectures

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present disclosure, a "packet optimized" delivery network is used for carriage of the packet content (e.g., IPTV content) when the request issues from an MSO network (see discussion of FIG. 2a below). FIG. 1c illustrates one exemplary implementation of such a network, in the context of an IMS (IP Multimedia Subsystem) network with common control plane and service delivery platform (SDP), as described in co-pending U.S. Provisional Patent Application Ser. No. 61/256,903 entitled "METHODS AND APPARATUS FOR PACKETIZED CONTENT DELIVERY OVER A CONTENT DELIVERY NETWORK", previously incorporated herein, Such a network provides significant enhancements in terms of common control of different services, implementation and management of content delivery sessions according to unicast or multicast models, quality-of-service (QoS) for IP-packetized content streams, etc.; however, it is appreciated that the various features of the present disclosure are in no way limited to any of the foregoing architectures.

Coupled Advertising Campaigns and Metrics

Consumers are becoming less engaged over time in many facets of advertising, due in part to the ability to bypass them whether by FF functions or the like, tuning away, or simply walking away to do other things. The same is true of video commercials and so-called "infomercials". However, a consumer can be more engaged through provision of some sort of benefit or incentive. For instance, secondary content (e.g., advertisements, infomercials, promotions, etc.) that provide high entertainment value to the consumer, such as for example commercials during the Super Bowl, will often be watched with great intent, Likewise, if there is a basis for interest for the consumer (e.g., the secondary content relates to goods or services or topics that of are particular interest to the consumer), the consumer will be increasingly engaged. Secondary content that provides the consumer with some intrinsic or actual benefit (e,g., a coupon, discount, savings on a frequently used service, etc.) will likewise typically have high rates of engagement.

Accordingly, one aspect of the present disclosure relates to increasing the "value" of secondary content such as advertisements, and accordingly providing better value for the advertisers. These goals are accomplished in the exemplary embodiment by: (i) providing enhanced integration between television media campaigns and print, online, or telephonic promotion/discount campaigns that the advertiser(s) may be running; (ii) providing a mechanism to measure and validate that the viewer watches the complete television commercial and has been sufficiently engaged so as to receive the complete message from the advertiser; (iii) providing a means to offer incentives to the viewer to watch a given advertisement or collection of advertisements/promotions, or engage in other desired behavior(s), such as via points or credits obtained through interaction that can be traded for gifts, products, service discounts etc., or delivery of product/service coupons and discount through interaction either electronically or through mail or email; and (iv) collection of better metrics for advertising campaigns that can provide more useful information to the advertisers (and network operators and campaign implementation entities).

FIG. 2 illustrates one embodiment of a network architecture configured to implement the foregoing features (i)-(iv). As illustrated, the architecture 200 includes a network-side entity 202 (e.g., a server or other process disposed at or in logical communication with the network head-end), a network interface 204 to an advertiser server or other entity 206 (such as via a communication network 207 such as the Internet), and a user or subscriber database 208 in communication with the server 202 (and which retains user or subscriber-related information). In one implementation, the server 202 includes an application or process 210 running thereon which is configured to obtain performance or behavior data from the CPE 106 of the network 101, and store/process this information to extract useful data therefrom.

The enhanced integration between television media campaigns and print, online or telephonic campaigns that the advertiser may be running is provided by, in one embodiment, one- or two-way information flow between the network operator (server 202) and the advertiser server/entity 206. Specifically, infoitiiation gleaned via the aforementioned application 210 is in one case passed to the advertiser server 206 (via the network server), the latter being able to utilize this information with respect to the print and/or on-line or telephonic campaigns. For instance, if user behavior regarding a given advertiser spot on the managed (television) network 101 indicates that the ad is ineffective (e.g., viewers are largely tuning away at onset), this information can be used to cause a substitution of an ad in the on-line or email campaigns which has a higher likelihood of success. It can also be used to generate an input signal to the MSO's own content delivery system 209 (e.g., VoD server, linear service, IPTV, etc.) to cause changes in the delivery of secondary content over the MSO distribution network 101 to its subscribers.

Similarly, certain "windows" can be set up such that intervention in the print media campaign may occur before a given vehicle (e.g., newspaper, magazine, flyer, mailer, etc.) is actually printed and distributed (e.g., 24 hours before print at a given printer selected by the advertiser). This underscores one salient advantage of the architecture of the illustrated embodiment; i.e., that the television campaign can be used to provide effectively real-time feedback (by virtue of the large pool of network users and subscribers, and the feed of behavioral data from that pool via their respective CPE up to the network server 202) and hence dynamic input/control over the other campaigns.

It will be recognized that the term "print" as used herein includes without limitation both actual printed media, and virtual print (such as an electronic newspaper, printable coupons, etc.), such that significant overlap may exist with more traditional on-line venues such as advertising spots before on-line videos, banner ads, or the like.

It is appreciated that while the foregoing discussion contemplates the television (e.g., MSO network) being the campaign "driver" (i.e., information obtained from the television network is passed to the other campaigns (which may also include recommendations or even commands to execute certain actions, such as replacement of an advertisement with another; adjusting the time slot of a given advertisement, etc.), and/or used to make control decisions therefor), other permutations are possible. For example, feedback or data gleaned from the email or on-line campaigns may be used as input or to control the television and print campaign, and so forth. For example, a media player application running on a user's computer or mobile device may be configured to detect Internet radio station channel changes consistent with airing of certain secondary content; akin to the CPE-based variants described herein, this information may be passed up to a network server for transmission to the other media campaigns (e.g., via the interface 204 discussed supra).

As noted above, information flow between the various entities within and without the MSO network 101 may be one-way or two-way. For example, in one variant, information flows from the MSO network (server 202) to the other campaigns via the advertiser's server 206, and no information is fed back to the MSO server 202. The same or similar information may be fed to a plurality of different advertisers/servers simultaneously if desired; e.g., via a broadcast mode. While timing can be important in certain implementations (e.g., where the different campaigns are tightly bound, such as where delivery/coordination of the secondary content is time-sensitive, such as during halftime at the Super Bowl where television and on-line advertising is structured to target various facets of the game), no real QoS or other requirements exist, and hence literally any delivery mechanism can be utilized for delivery of the data. Alternately, information flow can be two-way (as shown in FIG. 2); e.g., from the television to the other campaigns for dynamic/control data, and from the other campaigns inward to the MSO network so as to provide the MSO any updates, useful data on user response, effectiveness of a given secondary content element, etc.

Transfer of data from one entity in the architecture 200 to another may be conducted on a continual bases, periodically, in an event-driven manner (e.g., whenever sufficient data is accumulated, whenever "pulled" by the receiving entity, etc.), or according to any other schemes that will be recognized by those of ordinary skill given the present disclosure. The network interface(s) 204 may further be of any type suitable to convey the desired information, such as e.g., via broadband connection, Wi-Fi, WMAN (e.g., WiMAX), millimeter wave system, cellular or backhaul, etc. Communication between the individual CPE 106 of the MSO network 101 and the server 202 can be accomplished using normal upstream communication modes resident in the MSO network (e.g., OOB RF on a CaTV network, or wireless uplink to a satellite), or via a complementary data connection (e.g., DOCSIS modem or the like).

Regarding item (ii) above, user agent software is disposed in the digital set-top box or other user CPE (which may include the user's mobile devices; see discussion of FIGS. 4 and 5 below) in one implementation; the software keeps track of commercials or other secondary content, and determines that the viewer has met desired performance criteria (e.g., watched a prescribed portion or the entire video segment without fast forwarding, skipping or changing channels, or has otherwise met a desired behavior criterion). This determination may be binary (e.g., met the criteria or did not meet the criteria), or linear (e.g., watched 75% of the commercial without changing channels) in nature, or use yet other logical constructs (e.g., fuzzy logic-based, such as "most", "some", or "little"). In one configuration, the application running on the CPE is adapted to track (1) the user's tuning activities (such as via channel change commands), (2) the user's trick mode commands (e.g., FF, REW, pause), (3) input provided by the user (such as answers to "yes/no" questions or the like), and (4) user's requests for telescoping or other additional information sources. In one particular implementation, the user's CPE-based application collects the foregoing data and forwards it to the network-side entity (e.g., advertising management server 202 of FIG. 2 herein) which utilizes the data to perform evaluations of the various metrics of interest to the MSO and/or advertiser. Various processing tasks can also be performed by the CPE itself, depending on how "thick" its processing capabilities are. Cues within the program stream (such as SCTE cues or the like) can be used to determine start, end and "waypoints" within a given advertisement to facilitate collection of the foregoing data (e.g., how much of a given commercial was watched, interactivity windows, etc.).

The CPE may also include a mechanism to determine whether a user is actually viewing the monitor (and hence ostensibly the secondary content). For example, in one variant, a passive IR (PIR) or similar device is disposed on or proximate the CPE so as to monitor the viewing location for a "warm body", thereby indicating that the user has not simply left the room but not changed the channel). Acoustic-based sensors may also be used, such as to indicate that a user is moving, talking, etc. Similarly, a speech-recognition based system may be employed, so as to receive user verbal input as to the secondary content (e.g., "I hate this ad!"), which may be desirable both for deteiinining whether the user was engaged (i.e., did not leave the room), and how the user felt about the content. Likewise, an accelerometer of the type used on e.g., tablet computers may be employed within the user's remote control device (or mobile device used to control the CPE) so as to indicate that the user is watching; i.e., changes in acceleration or device attitude tend to indicate that the user is actively engaged, especially where the distance at which communication with the CPE is restricted so that the user must be directly proximate or in LOS of the CPE/monitor. To this end, short-range communication systems such as active or passive RFID or NFC (e.g., EPC Global GEN2, ISO 14443 or 18000-3) of the type known in the radio frequency arts may be used to control both the distance and directionality (if desired) of wireless RF communications between the user's remote or mobile device and the CPE to effectuate such functionality.

In another more "passive" implementation (FIG. 2a), a portion of the foregoing functions are provided on the network side; e.g., by the server 202 in communication with other network entities (such as a VoD server 209, etc.). For example, network-serviced functions such as VoD trick mode commands, telescoping ad requests, etc. are monitored by the server 202 and analyzed to determine if the desired criteria have been met. In one variant, any information which must be obtained from the CPE is sent up to the network in "raw" form, and then evaluated by the server 202 (as opposed to more extensive processing on the CPE and in the prior embodiment). This approach has the benefit of making the CPE even "thinner" and requiring less extensive retrofit in the case of the installed CPE base.

In another variant, an ETV application is utilized (as or as part of the CPE application 210) that is logically bound to the advertising spot and that offers one or more incentives to the viewer to watch the complete commercial and provide interactivity via the user's CPE input device (e.g., remote, mouse, touch screen, etc.). For instance, in one implementation, an interactivity window is specified (e.g., last 5 seconds of the advertisement) where input from the viewer can be used to validate the user's presence/engagement with the content, or other aspects of the user's behavior (such as for example by answering a question correctly to validate cognizant viewing or understanding, or to determine whether a user liked the advertisement, if they might buy the product, if they want to "telescope" to a source of more information such as a hyperlink or another advertisement or promotion or infomercial with more detail on the advertises product or service). The foregoing speech recognition system of the CPE 106 may also be utilized in this regard; e.g., so as to obviate the user having to pick up the remote, etc.

Regarding item (iii) above, if the requisite criteria or validation is met, the user may then for instance be provided with some consideration (e.g., credited "points" to the viewer's account, either with the service provider (e.g., MSO subscriber account) or advertiser). The credits may be non-negotiable (e.g., as an offset to later "debits" e.g., with respect to menu functions, other advertisements, etc.), or actually negotiable for some good or service or other consideration to the user (e.g., coupons, discounts off products/services, etc.). This consideration may be credited to a user electronically (e.g., via an account maintained by the MSO or advertiser or third party service/product provider such as Amazon.com), or alternatively mailed or emailed to the user so that they can redeem via email or in person at a provider, or via an electronic payment service such as Google Wallet™ mid isposed on their NFC-enabled mobile device.

In another embodiment, the foregoing application installed on the user's CPE can be configured to collect all desired metrics and usage data; the collected data can be used to provide inter alia, integrated reporting between or relating to a television commercial campaign or particular advertising spot, a promotion/discount (and how or when it is used by a particular viewer or household), and demographics and/or pyschographics based on, e.g., subscriber information obtained from service provider (consistent with privacy maintenance). For example, user demographic or psychographic information obtained by the MSO at e.g., time of account creation, or via ongoing user feedback or analysis of viewing habits, can be coupled to the data relating to particular secondary content to provide the advertiser or other third party with valuable insight into user behavior. For instance, consider a given secondary content element (e.g., advertisement) relating to sports cars. It is useful for the advertiser to know the relevant demographics and/or pyschographics related to the user with whom the generated data is actually associated in order to gauge the efficacy of the advertisement. If a user at the given home is an elderly woman (who ostensibly would have little need or interest in a sports car), and she tuned away from the ad promptly, then little useful information as to the efficacy of the advertisement relating to the target demographic (e.g., single males between 20 and 50 years of age) can be gleaned from this one data set. More broadly, if the majority of viewers watching the advertisement were outside the target demographic, then one could expect that the efficacy of the advertisement for that group would be very low (i.e., most would tune away, skip, walk away, etc.). However, without the supporting MSO-specific demographic/pyschographic data, the advertiser might just be led to believe that their advertisement was somehow deficient, and may simply replace it, which may be an erroneous conclusion.

The foregoing approach advantageously provides the MSO and/or advertiser with the ability to track whether the viewer watched the complete video segment for the commercial, as well as the ability to produce higher viewer engagement by offering incentives to the viewer for watching the complete segment. Television media campaigns can also be integrated and correlated with other discount/promotion campaigns run by the advertiser, and thus provide data which is more useful to the advertiser (or network operator).

As an example of such integration of campaigns and associated reporting, consider a given viewer (or CPE or household) that is presented with and watches a given television commercial delivered via the network service provider's infrastructure (e.g., a Start Over or Look Back delivery, or linear broadcast). Those users who interact as described above can be identified and provided discounts as appropriate, and the type of interaction and discount offered can be tracked. Moreover, the user's actual use or negotiation of the discount or promotion can be tracked, such as via coordination with the product or service provider to which the discount or promotion is associated (e.g., an MSO-sponsored program, an online retailer such as Amazon.com, a retailer local to the user, etc.). For instance, the MSO and/or advertiser may have an arrangement with Amazon.com to report a service provider subscriber's redemption or negotiation of a discount or coupon sourced by that same service provider, thereby providing insight to that subscriber's behavior for both the MSO and the underlying advertiser.

Feedback provided to the service or product provider, advertiser, or MSO can also be collected and evaluated, such as where on-line "ratings" provided by purchasers of the goods/services with which the coupons or discounts are associated are fed-back. This information also allows for targeted or correlated follow-up campaigns (such as for new products/features) through e-mail/mail or other media. Consumer loyalty to certain brands or providers can also be tracked in this fashion.

As previously noted, the architecture 200 of FIG. 2 may be configured so as to be "tightly coupled" between two or more of the various media campaigns, especially where temporal aspects are involved. Specifically, in one embodiment, temporal attributes relating to the secondary content (i.e., start air time, run length, relationship to an external event, etc.) are determined and communicated between the two or more entities such that the two or more campaigns are synchronized to the external event, For example, a "blitz" of advertising relating to a given product or service may be coordinated for a short or prescribed period, such as halftime of the Super Bowl. Television, email, on-line banner ads, pop-up website ads, video trailer ads, etc. can all be coordinated in the exemplary embodiment so as to permeate all media channels available to the advertiser. The advertising may also include time-sensitive interactive or response features, such as where the viewer has a limited time to respond or interact, or negotiate an offer (such as redemption of a coupon or on-line credits or points).

It will also be appreciated that the CPE 106 may include gateways, intermediary entities, as well as user mobile devices (e.g., smartphones, tablets, phablets, PCs, laptops, etc.) in communication with the CPE so as to extend the functionality to the mobile or other user devices. For example, in one variant (FIG. 2a), the architecture 220 includes a premises network 221 with an MSO provided (e.g., leased) DSTB 222, gateway 224, DVR 226, and wireless interface 228 (e.g., WLAN such as Wi-Fi) for communication with the user's consumer or non-leased mobile device 230, the latter which runs an application ("app") configured to collect the data regarding secondary content (and user interactions therewith). The collected data is then sent from the mobile device 230 to the gateway (such as via any well known data communication protocol such as HTTP/TCP or SMS/MMS), whereby the gateway performs any requisite pre-processing of the data and forwards it to the network server 202 via an upstream communication channel as previously described.

Figure 2A:
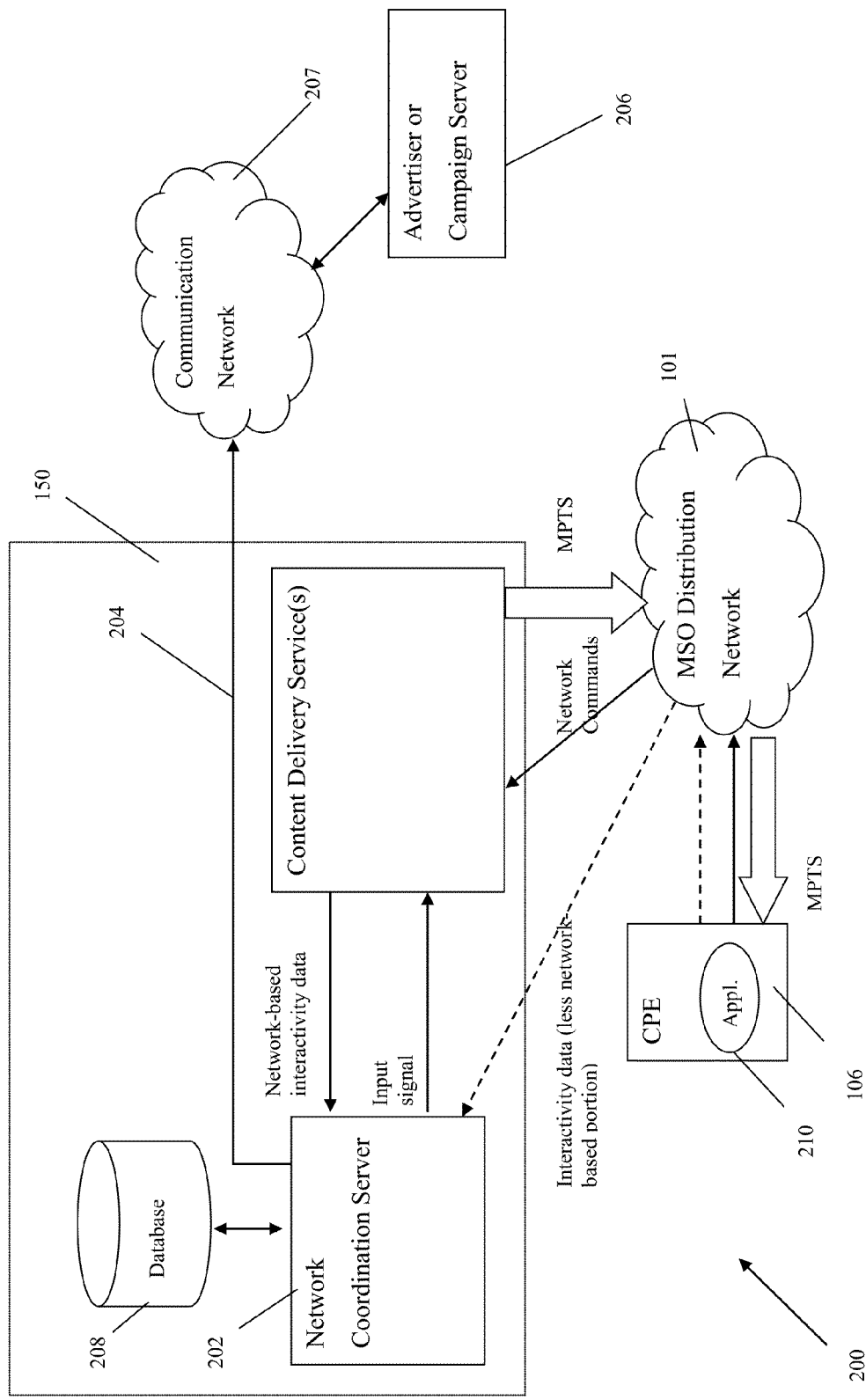

It will be appreciated that in the embodiment of FIG. 2a, content stored on the user's DVR 226 in their premises network 221 may also be used as the basis of collecting data, albeit more latent than broadcast (linear) or other content streamed from the MSO headend in real time. Hence, in one such case, a user DVR's a movie with five (5) commercials embedded therein. Each commercial is viewed (or not viewed) by the user, and appropriate data regarding the user's tuning behavior, trick mode use, interactivity, etc. are obtained during playback (whether by the CPE or mobile device), and the information forwarded to the head end server 202.

FIG. 3 herein provides a graphical illustration of one implementation of the foregoing techniques. As shown, three different media campaigns 302, 304, 306 are used by a given advertiser in promotion of their goods/services; i.e., television, print, and online/electronic. Coordination between the campaigns is effected by use of integrated metrics 310 of the type described above; e.g., data obtained from user television interaction, redemption of coupons or discounts, response to emails or surveys, feedback, etc. A focused or targeted user set 308 is also optionally identified via the metrics 310, and useful data fed back 311 to the varying campaigns 304, 306 from the metrics so as to further refine (i) the targeting, (ii) provision of secondary content and considerations, and (iii) coordination between the campaigns. The metrics 310 may also be used to evaluate campaign effectiveness and return on investment (ROI) 312, or other parameters of interest such as user engagement, market penetration, etc.

FIG. 4 illustrates one embodiment of a generalized method of operating a content distribution network so as to provide media campaign coordination. As shown, he method 400 includes first selecting and delivering secondary content (e.g., promotion, advertisement, etc.) to a user of the network at step 402. For example, an advertiser might pay an MSO to insert the secondary content element(s) into a linear broadcast, VoD delivery, IPTV stream, etc. as part of the MSO's normal content distribution functions.

The secondary elements may be encoded with information useful to the recipient CPE. For example, information regarding when and how to display the secondary content, campaign and instance identifier that will be used for reporting and metrics data collection may be provided. In addition, either a URL link to the application and any metadata or a packaged resource that constitutes the actual application and any metadata required may be provided. The application for the secondary content may be authored and packaged using industry standard technologies such as EBIF, OCAP-JAVA, HTML, Flash. In one implementation industry standards such as OCAP-ETV or SCTE are used to signal and notify the secondary content to CPE devices. Such signal can be embedded within the video transport stream such as MPEG2TS, HLS or Smooth Streaming and thus provide synchronization with the actual video content for the advertisement campaign. The signaling for the secondary content application may also specify certain target qualifiers which allows to the target the promotion/campaign to a subset of subscribers which match the specified qualifier set. The secondary content application may also utilize any subscriber/user profile available on the CPE device at runtime for customizing or personalizing the advertisement campaign message to the subscriber.

As previously indicated, the user in the exemplary embodiment is a subscriber or customer of the network, the latter which is a managed network such as e.g., a satellite or cable network. In the exemplary implementation, the secondary content is bound to a client application running on the user's CPE (e.g., DSTB, mobile device, gateway) which evaluates one or more parameters relating to the user's interaction with the secondary content.

At step 404, the delivered secondary content is viewed by the user, such as via watching a given program channel at their premises. In a simple case, a linear broadcast of a television show with commercials is viewed by a user via their DSTB on their local monitor.

Next, per step 406, the user's behavior with respect to the secondary content is recorded, using e.g., the application running on the CPE 106. In one embodiment, raw data regarding user channel changes, trick mode use, and/or interactivity with the secondary content is captured (via the application) and stored at the CPE. For example, data on one or more of: (i) duration of viewing (e.g., did they watch the entire segment, part of it, etc. before tuning away, utilizing a trick mode command, powering down, etc.), (ii) selection of one or more functions such as trick mode (e.g., did the user FF through the advertisement, REW so as to watch all or a portion again, etc.; (iii) requests for additional correlated or uncorrelated information (such as via a telescoping link or function, such as that described in co-owned and co-pending U.S. patent application Ser. No. 10/662,776 filed Sep. 15, 2003 and entitled "SYSTEM AND METHOD FOR ADVERTISEMENT DELIVERY WITHIN A VIDEO TIME SHIFTING ARCHITECTURE", incorporated herein by reference in its entirety); (iv) interactivity with one or more functions associated with the secondary content (e.g., respond to a question prompt) may be captured by the CPE/bound application; and (v) use or negotiation of any discounts, coupons, promotion codes, etc. that the user redeems via their CPE.

At step 408, the captured data is optionally pre-processed, and transmitted upstream to the network server 202 for further analysis, evaluation, and/or transmission to other entities (such as associated campaigns, advertisers, etc.). As noted previously, all or portions of the foregoing evaluation of step 408 may be performed on the CPE running the bound application, or on the network (e.g., server 202), or various combinations thereof. For example, in one exemplary approach, all of the user interactivity/evaluation data is packaged up by the bound application, and transmitted to the network server 202 for evaluation. In another approach, at least a portion of the evaluation data is pre-processed at the CPE, and then the pre-processed data (and any other remaining data necessary for the evaluation) is forwarded to the server 202 for further analysis. For example, the bound CPE application may be configured with sufficient "intelligence" such that it can at least identify when information need not be sent to the network server (e.g., no channel change/tuning events during the period of interest, and hence such information need only be sent when change/tuning events occur; otherwise, it can presumed that none occurred). Likewise, if no interactivity or trick mode commands are invoked during the period, information to that effect need not be sent (again, presumed not to have occurred in the absence of data to the contrary). Similarly, events outside the period or window of interest (e.g., before or after the rendering or a particular secondary content element) need not be evaluated, so as to further simplify the process and software.

At step 410, the (remaining) evaluation and analysis of the user data is performed by the network server 202 (and/or any proxy entities or processes needed at the headend). This includes obtaining and processing any input received from the other campaigns as shown in FIG. 3 (step 412), such as information relating to user redemption or use of coupons, promotion codes, discounts, user click-throughs on Internet advertisements, etc. via third parties, and generation of the target data of interest (e.g., integrated metrics or IM, and ROI) per step 414. This data (including any other data of relevance) is stored at a local database at step 416 (e.g., the database 208 of FIG. 2), such as based on CPE/account identification (i.e., associating the data with a particular subscriber/account/CPE). This approach has the benefit of being able to particularly characterize the behavior of individual subscribers or accounts, yet may also feasibly raise privacy concerns, since the stored data is representative of actual specific user behavior. Hence, in another variant, the data may also be anonymized (e.g., using for instance the methods and apparatus set forth in co-owned and ea-pending U.S. patent application Ser. No. 11/186,452 filed Jul. 20, 2005 and entitled "METHOD AND APPARATUS FOR BOUNDARY-BASED NETWORK OPERATION", incorporated herein by reference in its entirety, thereby preventing any association of stored data with particular users or premises. For example, in one such implementation, evaluated user interactivity data from multiple subscribers of the MSO network is "pooled" in a common storage location, aggregated, and/or statistically evaluated or packaged as a whole. Alternatively, the anonymized data may be stored in respective individual storage location within the database 208, e.g., based on a cryptographic hash of the CPE's MAC or the user account's IP address, thereby providing per-user/account granularity, but with no possibility of being traced back to any particular user.

The processed data, integrated metrics 310, and ROI data 312 (or information relating thereto or derived therefrom, such as the foregoing statistically analyzed data) is also transmitted to the third party (e.g., advertiser) server(s) 206 or its proxy via e.g., a network connection or other interface per step 418. It will be appreciated that this data may also be fed directly into the "campaigns" themselves versus the commissioning advertiser(s), such as is shown in FIG. 3. For example, rather than route the extracted and processed metrics/ROI data to the advertiser's server 206, and requiring the advertiser to feed this information forward to the relevant campaign(s) (and thereby ostensibly introducing unwanted latency and possibly cost), the information may be sent directly to the executers of the campaign(s), e.g., on on-line advertising web server, printer (for print media campaigns), coupon/discount entities (such as Amazon.com), etc.

The transmitted data (whether sent to the advertiser's server, or directly to a campaign execution entity such as a printer's server) may comprise a standardized message format (e.g., the data is payload in an RTP, SIP, or other message, or may use a proprietary format if desired. It may also be encrypted and/or hashed for security, and/or anonymized as to origin as described elsewhere herein. The data may also be formatted as commands or recommendations versus processed data; e.g., "remove advertisement 1234, and insert advertisement 3456" or the like.

In certain variants, the feed-forward of information from the MSO network (i.e., television campaign) and/or input received from the other campaigns may be structured so as to avoid a "feedback loop" condition akin to that occurring in PID control systems and the like; i.e., information or corrective actions generated by the server 202 (or the advertisers/processes 206) are delayed or introduced incrementally, so as to prevent one or more of the individual campaigns (or the architecture 200 as a whole) from "chasing its tail". For instance, if input from an online campaign relating to Product X indicates a very low click-through rate, the integrated metrics developed by the server process 202 may indicate this in the form of data fed forward to the advertisers/campaigns (e.g., low efficacy of the given advertisements relating to the Product X). In turn, this may cause substitution of the advertisement(s) in question with others for the same or different products. However, the low click-through rate initially observed may be an artifact of, e.g., (i) time of day (e.g., Product X is most germane to those over 50 years of age, who characteristically use the Internet in the morning, and the input data was obtained in the evening); (ii) purely statistical variations (i.e., the input data was based on a very short period of time); (iii) the occurrence of an event (e.g., a video online going "viral" which somehow disparages Product X), etc. Hence, if the corrective actions implemented by the campaigns are adjusted for these factors (e.g., corrections only inserted once per day based on 24 hours of data aggregated and analyzed), then short-term fluctuations may be averaged-out, and a more stable campaign dynamic is advantageously achieved.

It will be appreciated, however, that in certain variants (e.g., those described previously herein relating to close coupling of the campaigns due to e.g., temporal factors), it may be desirable to mitigate such "averaging"; i.e., short-term fluctuations may be desirable so as to permit the individual campaigns and the architecture 200 as a whole to respond with sufficient rapidity. For example, if an entire campaign is run over the course of the Super Bowl (say, 5 hours start to finish), then instantaneous or near-instantaneous feedback may be necessary in order to gauge user/subscriber/viewer response and make adjustments accordingly in sufficient time to make a difference. Consider the case where the input from an online advertising campaign for Product Y invoked at the beginning of the Super Bowl indicates a very low click-through rate (indicating basically a "flop"), then rapid adjustment is needed to swap out a similar ad to be broadcast over the television campaign, or to be emailed to users at halftime. Similarly, low user interactivity or impression rate on the television campaign may require rapid action to correct on-line and/or print campaigns which are schedule for delivery shortly thereafter.

CPE

FIG. 5 illustrates an exemplary embodiment of the improved CPE according to the present disclosure.

Figure 1D:
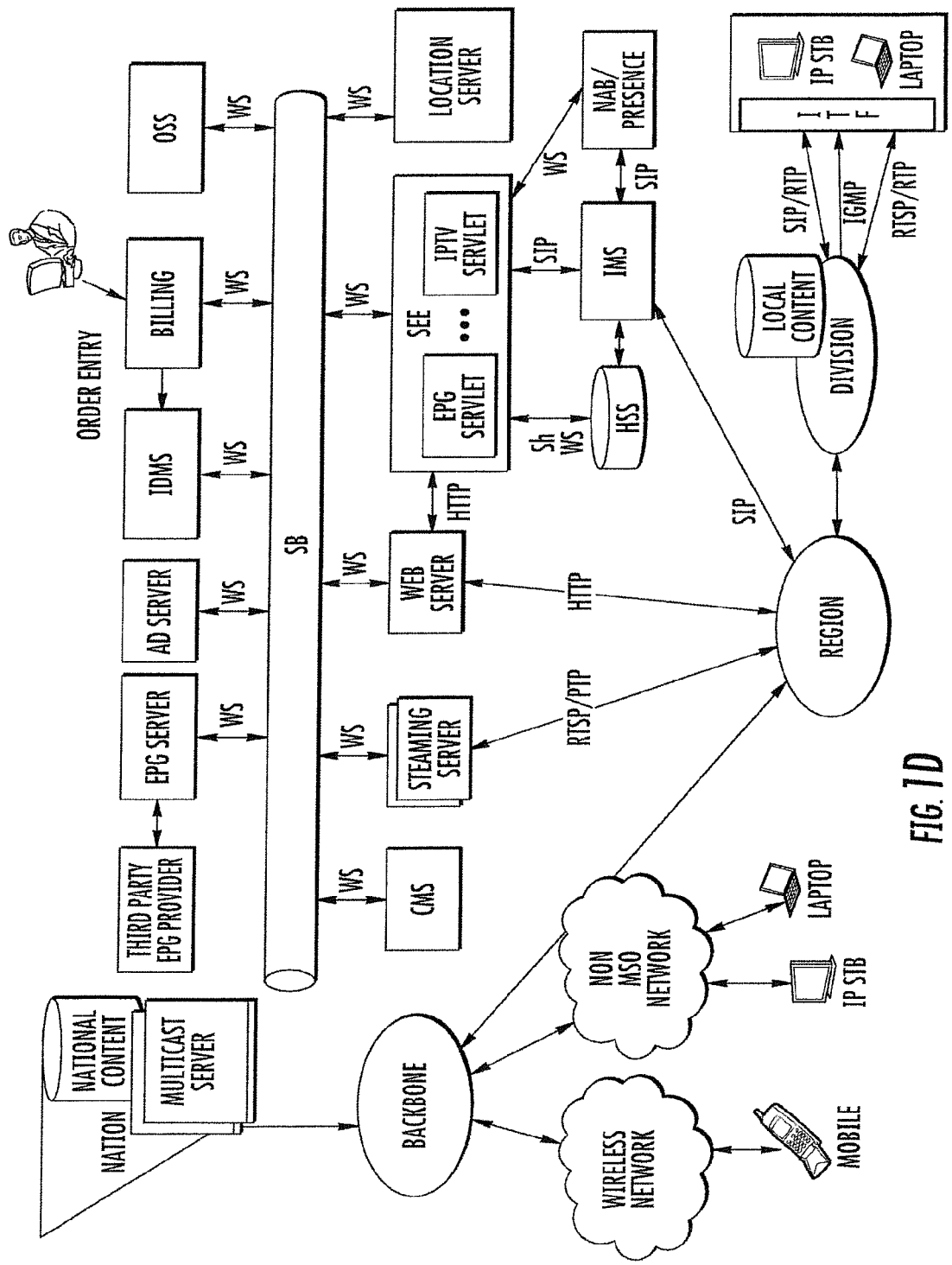

As shown in the simplified diagram of FIG. 5, the exemplary device 106 generally comprises an OpenCable (OCAP)-compliant embedded system having an RF front end 502 (including tuner and demodulator/decryptors) for interface with the HFC network(s) 101 of FIGS. 1-1*d*, digital processor(s) 504, storage device (memory) 506, and a plurality of interfaces 508 (e.g., video/audio interfaces, IEEE-1394 "Firewire" or Thunderbolt™, USB, serial/parallel ports, etc.) for interface with other end-user apparatus such as televisions, personal electronics, computers, Wi-Fi or other network hubs/routers, etc. A mass storage device 509 (e.g. HDD or the like) may also be provided, and can be used for e.g., DVR storage of content, storage of a local database of user interactivity data, etc.

Other components which may be utilized within the device (deleted from FIG. 5 for simplicity) various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The exemplary CPE of FIG. 5 is also provided with an OCAP 1.0-compliant application and Java-based middleware which, inter alia, manages the operation of the device and applications running thereon (including the aforementioned bound client software process where used). It will be recognized by those of ordinary skill that myriad different device and software architectures may be used consistent with the selective enforcement functions of the present disclosure, the device of FIG. 5 being merely exemplary. For example, different middlewares (e.g., MHP, ARIB, or ACAP) may be used in place of the OCAP middleware of the illustrated embodiment.

The exemplary CPE further comprises a conventional "Watch TV" application or the like, which services those program or user channels available over the network. The Watch TV application, residing in memory, provides such functions as channel navigation control, channel selection in response to a channel change event, etc. In one embodiment, the Watch TV (or EPG) application further comprises all necessary functionality need to support the data collection client process.

In another embodiment, the CPE 106 comprises a converged premises device, such as for example that described in co-owned and co-pending U.S. patent application Ser. No. 11/378,129 filed Mar. 16, 2006 and entitled "METHODS AND APPARATUS FOR CENTRALIZED CONTENT AND DATA DELIVERY", incorporated herein by reference in its entirety.

As previously noted, the CPE of FIG. 5 further comprises in one embodiment a client application or module 210 configured to collect and/or transmit data relating to user interactivity, tuning, etc., in the form of e.g., a software application running on the CPE. This software application may be configured to perform any number of functions relating to selective advertising or promotion delivery and enforcement, including without limitation: (i) identifying delivered secondary content having SCTE or other cues or metadata (or other coding) contained therein; (ii) extracting the necessary information, and (iii) utilizing the extracted information to facilitate collection of interactivity, tuning, or other user "behavior" data needed to conduct the evaluation or other functions of the architecture 200 (e.g., the method of FIG. 4 herein). For example, in one variant (corresponding to the network-centric variant discussed supra), the client device application is configured to use the extracted information to enable derivation of the user behavior data (e.g., user trick mode or tuning during a given advertisement of interest), and send the derived data to a network entity such as a headend server 202, so as to permit the headend server or other headend entity to perform further analysis, update the database 208, develop integrated metrics/ROI data, advise advertisers and other campaigns, etc.

Alternatively, the client application/CPE may be configured with more innate intelligence as previously discussed, such as where the determination of data to collect, and/or pre-processing or processing of any data that is collected, are at least in part performed by the CPE 106 before transmission to the network. This includes pre-processing of data obtained by or from connected mobile devices; e.g., Wi-Fi enabled phablet communicating with an AP within the user's premises, such as described below.

Moreover, it will be appreciated that while primary embodiments of the methods and network/client apparatus set forth herein are described, wherein the network side (e.g., headend) processes, generates, and distributes information relating to secondary content viewing (e.g., integrated metrics) with respect to both linear and "cloud" based storage and delivery paradigms (e.g., Start Over or Look Back functions), the various aspects of the disclosure may be applied to locally stored content; e.g., that stored on a premises DVR. While many DVR implementations or uses by individuals may not record secondary content (e.g., advertisements or promotions), any secondary content which is recorded may be the basis of user interactivity/behavior data collection by the CPE, such as previously described herein. For example, a user of the premises DVR may FF or skip the advertisement (or decide that they want to see it again), and such data may be captured by the bound CPE application on playback by the user, and forwarded to the network server 202 for use in development of the integrated metrics.

As noted above, any data of interest may be directly transmitted from the CPE ("pushed") to the upstream entity (e.g., server 202, or software portion, such as via an OOB message or other communication), or stored or logged in a file and sent when requested or "pulled" by the network entity (or according to other models, such as being sent periodically, on CPE startup, etc.).

The CPE 106 may also be in communication with, or may itself constitute, a mobile device, such as a wireless-enabled smartphone, tablet computer, laptop computer, etc. For example, in one variant of the CPE (not shown), the CPE is a tablet computer enabled for wireless (e.g., Wi-Fi) communication with a hotspot (802.11 AP), such that the user can receive MSO-originated nDVR, Look Back, Start Over, etc. services at the tablet device, and any trick mode functions (such as FF, REW, or jump/skip), user interactivity with advertisements, tuning, etc. can be selectively captured and transmitted upstream (as if it was the user's premises CPE).

Network Server

Referring now to FIG. 6, one embodiment of a network (e.g., server) device with data collection, processing, and media campaign coordination capability is described. As shown in FIG. 6, the exemplary device 202 generally comprises and OpenCable-compliant network server module adapted for use at the headend 150 of the network of FIG. 1, although it will be appreciated that the server may be disposed at other locations including for instance the hub site of FIG. 1c. Moreover, the server may comprise or be integrated with other types of devices (e.g., VOD or application servers) within the network as previously described.

The device 202 comprises a digital processor(s) 604, storage device 606, and a plurality of interfaces 607 for use with other network apparatus such as RF combiners, IP routers and other packet network devices, network management and provisioning systems, local PCs, etc. Other components which may be utilized within the network device 202 include amplifiers, board level electronic components, as well as media processors and other specialized SoC or ASIC devices. Support for various processing layers and protocols (e.g., 802.3, DOCSIS MAC, OOB channels, DHCP, SNMP, H.323/RTP/RTCP, VoIP, SIP, etc.) may also be provided as required, such as in support of data interchange between the network device 202 and the CPE, and the third party server(s) 206 or other media campaign apparatus. The data evaluation and analysis software is also disposed to run on the server module 202.

The device 202 of FIG. 6 may take any number of physical forms, comprising for example one of a plurality of discrete modules or cards within a larger network or hub device of the type well known in the art. The server may also comprise firmware, either alone or in combination with other hardware/software components such as those previously described (e.g., disposed in the aforementioned device). Alternatively, the device 202 may be a stand-alone device or module disposed at the headend, hub, or other site, and may even include its own RF front end (e.g., modulators, encryptors, etc.) or optical interface so as to interface directly with various portions of the HFC network 101. Numerous other configurations may be used. The device 202 may also be integrated with other types of components (such as satellite transceivers, encoders/decoders, etc.) and form factors if desired.

It can also be appreciated that the methods disclosed herein may be practiced using any configuration or combination of hardware, firmware, or software, and may be disposed within one or any number of different physical or logical entities. For example, the data collection, analysis, and campaign coordination fimctionality described above may take the form of one or more computer programs which may have one or more components distributed across various hardware environments at the same or different locations, such as where the network process is distributed across multiple platforms at the headend 150.

As yet another example, portions of the functionality may be rendered as a dedicated or application specific IC's having code running thereon. Myriad different configurations will be recognized by those of ordinary skill in the network arts provided the present disclosure.

Rules Engine

Various exemplary business-related aspects of present disclosure are now described in greater detail, along with exemplary embodiments of a "rules engine".

Specifically, in another aspect of the disclosure, the aforementioned media campaign coordination architecture (e.g., including one or more computer programs) optionally includes an entity having an operations and/or business rules "engine". This engine comprises, in an exemplary embodiment, a series of software routines that are adapted to control the coordination functions (e.g., collection of data from various CPE relating to delivered secondary content, evaluation of data, gathering of inputs from other campaigns, generation of integrated metrics/ROT data and recommendations relating thereto, and distribution of the data/recommendations to other entities and/or campaigns). These rules may also be fully integrated within the aforementioned one or more computer programs and be controlled via the entity on which the program is run, which may be for instance the network server 202 of the architecture 200 of FIG. 2, and/or on the CPE 106. In effect, the rules engine comprises a supervisory entity which monitors and selectively controls the campaign coordination and integration functions, so as to implement desired operational or business rules of the MSO or other parties of interest (e.g., advertisers or promoters).

The rules engine can be considered an overlay of sorts to the algorithms of the previously described computer applications. For example, the exemplary computer application may invoke certain operational protocols or decision processes based on data received (e.g., prior history, statistics, etc. of viewing of certain secondary content), as well as network operational or historical data, demographic/psychographic data, geographic data, etc. However, these processes may not always be compatible with higher-level business or operational goals, such as maximizing profit on a network-wide basis (or after consideration of other factors not examined by the collecting entities such as advertising revenue, RTA/acquisition costs, "costs" of delivering streams based on required bandwidth, taxes, maintenance or repair costs, additional equipment leasing or use costs, etc.), or system reliability and/or flexibility. As but one example, a given secondary content element (e.g., advertisement) may be flagged for removal within the television (MSO network) campaign based on e.g., very low click-through rate on the online campaign, but where the advertisement is flagged of one of importance or significance to the advertiser, or which has a dynamic temporal or demographic component (e.g., has a particular relevance as a function of time/date, or has a particular demographic relevance to the MSO subscriber pool or the portion of the pool watching at any particular point in time), the rules engine may override the selective replacement or substitution logic in the network headend and deliver the advertisement to the subscribers irrespective of its low click-through rate. Similarly, where the user has affirmatively or passively indicated a preference for certain types of content, the rules engine may selectively override the selective enablement or disablement decisions.

Per-user/CPE data (whether anonymized or not) may also be considered in the rules engine logic; e.g., if a given user or CPE historically does not FF or skip advertisements or tune away, or utilize telescoping mechanisms or other interactivity mechanisms, it can be inferred that the associated user has a relatively high "threshold for advertising pain" or little proclivity to interact with advertisements or the CPE in general, and hence they are not an optimal "data point" for basing campaign management decisions on. In such case, the rules engine may dictate that the CPE associated with that user be reduced in weighting compared to others, or even eliminated from consideration completely (e.g., no data is recorded and transmitted upstream; the bound application effectively remains dormant on that CPE).

In another embodiment, the rules engine may be configurable such that rules may be specified at various levels such as e.g., for MSO, geographic location, advertisement zones, campaigns, advertiser, advertising agencies, target content, subscriber groups, time of the day, season, external events, etc. The rules engine may also be configured to be self-learning such that new rules are dynamically applied based on other static rules which apply to certain patterns and/or thresholds of metrics data.

In another embodiment, the rules engine may be configured to enable targeted advertisements to be sent to the individual users as a unicast.

It will be recognized that while certain aspects of the disclosure are described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claims herein.

While the above detailed description has shown, described, and pointed out novel features of the disclosure as applied to various embodiments, it will be understood that various omissions, substitutions, and changes in the form and details of the device or process illustrated may be made by those skilled in the art. The foregoing description is of the best mode presently contemplated. This description is in no way meant to be limiting, but rather should be taken as illustrative of the various general principles of the disclosure.

What is claimed is:

1. A method of operating a content distribution network having a plurality of users associated therewith, the method comprising:
   providing at least one of the plurality of users with at least a primary content element and a secondary content element;
   evaluating a duration of time that the at least one of the plurality of users has viewed the secondary content element; and
   based upon the act of evaluating, electronically crediting an account associated with the at least one of the plurality of users with one or more forms of consideration when the duration of time meets a threshold, the threshold comprising an amount of time equal to a portion of the entire duration of the secondary content element;
   wherein the one or more forms of consideration are configured to be negotiable for at least one of: goods, services, and/or one or more second forms of consideration.

2. The method of claim 1, wherein the network comprises a managed network, and the one or more forms of consideration comprise virtual consideration comprising points electronically credited to the account associated with the at least one of the plurality of users and maintained by an operator of the network.

3. The method of claim 2, wherein the virtual consideration comprises consideration that can be used by the one of the plurality of users to avoid or skip at least a portion of a secondary content element delivered by the distribution network.

4. The method of claim 1, wherein the act of evaluating comprises providing the at least one of the plurality of users with one or more questions relating to the secondary content element, and receiving an answer from the at least one of the plurality of users.

5. The method of claim 1, further comprising generating an output, based upon the act of evaluating, for use by another media channel in delivering advertising or promotional content relating to the secondary content element.

6. The method of claim 5, wherein the output comprises a recommended action for the another media channel.

7. The method of claim 5, wherein the output comprises a command for the another media channel to implement a removal and insertion action with respect to the delivery of advertising or promotional content relating to the secondary content element.

8. The method of claim 1, wherein the evaluation further comprises receiving from the at least one of the plurality of users a correct answer to a question presented thereto.

9. The method of claim 1, wherein the evaluation further comprises (i) obtaining an input regarding whether the at least one of the plurality of users liked an advertisement; and (ii) obtaining input regarding whether the at least one of the plurality of users would purchase a product or service.

10. A network server device configured to collect data relating to a user's interaction with one or more content elements and distribute at least one of (i) a portion of the collected data; and/or (ii) second data generated based at least in part on the collected data, the device comprising:
a network interface configured to receive the collected data from a content distribution network;
a processor in data communication with the network interface; and
logic in data communication with the processor, the logic configured to:
based on the user's interaction with the one or more content elements, provide the user with a discount or promotion for use with a third party entity;
evaluate the collected data relating to the user's interaction with the one or more content elements to identify one or more features thereof;
generate second data that is based at least in part on the collected data relating to the user's interaction with the one or more content elements relating to the one or more features; and
collect third data from the third party entity relating to a use of the discount or promotion by the user;
distribute at least the generated second data and the third data to one or more evaluation entities for use in one or more correlated media advertising or promotion campaigns.

11. The network server device of claim 10, wherein the collected data is account, premises, and/or user-specific data, and the logic is further configured to anonymize at least portions of the data so as to preclude a correlation of individual ones of the collected data to a respective account, premises and/or user from which the individual ones of the data was collected.

12. The network server device of claim 11, wherein the anonymization comprises generation of a one-way cryptographic hash based on at least one of: (i) a MAC address of a CPE associated with a subscriber account; and/or (ii) an IP address associated with the subscriber account.

13. A user device configured to obtain data relating to interaction with one or more secondary content elements associated with a first program stream by a user thereof, the user device comprising:
a network interface configured to receive the one or more secondary content elements associated with the first program stream;
a storage device; and
a processor in data communication with the network interface, the processor configured to run at least one computer program thereon, the computer program comprising a plurality of instructions which are configured to, when executed:
obtain data from one or more input devices associated with the user device, the data comprising information relating to an initiation of a trick mode functionality with respect to a first one of the one or more secondary content elements associated with the first program stream;
forward the obtained data to a network entity via the network interface;
receive a determination from the network entity that the first one of the secondary content elements is ineffective based, at least in part, on the obtained data relating to the initiation of the trick mode functionality; and
based, at least in part, on the reception of the determination that the first one of the secondary content elements is ineffective, receive a second program stream configured to have the first one of the one or more secondary content elements replaced with a second one of the one or more secondary content elements.

14. The user device of claim 13, wherein the user device comprises a leased device for use within a managed network.

15. The user device of claim 13, wherein the obtained data comprises at least one of: (i) information relating to a user's interaction with a telescoping function; and/or (ii) information relating to a user having marked an individual one of the one or more secondary content elements as a favorite.

16. The user device of claim 13, wherein the obtained data comprises data relating to a selection of a command causing the user device to perform at least one of: (i) a fast forward of the first one of the one or more secondary content elements associated with the first program stream; (ii) a rewind of the first one of the one or more secondary content elements associated with the first program stream; and/or (iii) a pause of the first one of the one or more secondary content elements associated with the first program stream.

17. The user device of claim 13, wherein the user device comprises a non-leased consumer device.

18. The user device of claim 17, further comprising extraction of the obtained data from a packetized stream carried over the network via a transport control protocol (TCP).

19. The user device of claim 18, wherein the packetized stream is further carried over the network via a multiplexed transport stream (MPTS).

20. The user device of claim 18, wherein the obtained data comprises data relating to a selection of a command causing the user device to perform at least one of: (i) a fast forward of the first one of the one or more secondary content elements associated with the first program stream; (ii) a rewind of the first one of the one or more secondary content elements associated with the first program stream; and/or (iii) a pause of the first one of the one or more secondary content elements associated with the first program stream.

21. The user device of claim 13, wherein the network interface comprises a wireless interface configured for ad hoc communication with another wireless enabled device or access point.

* * * * *

UNITED STATES PATENT AND TRADEMARK OFFICE
CERTIFICATE OF CORRECTION

| | | |
|---|---|---|
| PATENT NO. | : 9,131,283 B2 | Page 1 of 1 |
| APPLICATION NO. | : 13/715976 | |
| DATED | : September 8, 2015 | |
| INVENTOR(S) | : Vipul Patel et al. | |

It is certified that error appears in the above-identified patent and that said Letters Patent is hereby corrected as shown below:

Title Page, item (57)

"Abstract: In one embodiment, the apparatus includes a server and associated client processes disposed ob various components of a managed content distribution network (e.g., cable or satellite network). The server process coordinates with the client processes to obtain user interactivity data useful is assessing the efficacy of certain secondary content (e.g., advertisements)."

Should Read:

--Abstract: In one embodiment, the apparatus includes a server and associated client processes disposed on various components of a managed content distribution network (e.g., cable or satellite network). The server process coordinates with the client processes to obtain user interactivity data useful in assessing the efficacy of certain secondary content (e.g., advertisements)."--

Signed and Sealed this
Third Day of May, 2016

Michelle K. Lee
*Director of the United States Patent and Trademark Office*